(12) United States Patent
Roberson et al.

(10) Patent No.: US 10,954,369 B2
(45) Date of Patent: Mar. 23, 2021

(54) METHODS AND POLYMER COMPOSITIONS FOR MATERIAL EXTRUSION 3D PRINTING

(71) Applicant: Board of Regents, The University of Texas System, Austin, TX (US)

(72) Inventors: David A. Roberson, El Paso, TX (US); Kevin Schnittker, El Paso, TX (US); Jose Gilberto Siqueiros, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 504 days.

(21) Appl. No.: 15/237,562

(22) Filed: Aug. 15, 2016

(65) Prior Publication Data
US 2020/0181385 A1    Jun. 11, 2020

Related U.S. Application Data

(63) Continuation-in-part of application No. 14/960,247, filed on Dec. 4, 2015, now abandoned.

(60) Provisional application No. 62/087,645, filed on Dec. 4, 2014.

(51) Int. Cl.
| | | |
|---|---|---|
| *C08L 55/02* | (2006.01) |
| *C08L 23/06* | (2006.01) |
| *C08L 25/10* | (2006.01) |
| *C08L 25/12* | (2006.01) |
| *B33Y 70/00* | (2020.01) |
| *B29C 64/336* | (2017.01) |
| *B29C 64/106* | (2017.01) |
| *B29K 55/02* | (2006.01) |
| *B29K 23/00* | (2006.01) |
| *B29K 9/06* | (2006.01) |

(52) U.S. Cl.
CPC ............ *C08L 25/12* (2013.01); *B29C 64/336* (2017.08); *B33Y 70/00* (2014.12); *B29C 64/106* (2017.08); *B29K 2009/06* (2013.01); *B29K 2023/0683* (2013.01); *B29K 2055/02* (2013.01); *C08L 2205/025* (2013.01); *C08L 2205/03* (2013.01); *C08L 2207/04* (2013.01); *C08L 2207/068* (2013.01)

(58) Field of Classification Search
CPC .................................................. C08L 2205/03
See application file for complete search history.

(56) References Cited

U.S. PATENT DOCUMENTS

2007/0037927 A1*  2/2007  Yang ..................... C08L 53/025
                                                          525/88
2010/0316854 A1* 12/2010  Gardner ................... B32B 9/02
                                                          428/206

OTHER PUBLICATIONS

Rocha et al., J. Mater. Res., vol. 29, No. 17, Sep. 14, 2014.*
Google search history (Oct. 26, 2020).*

* cited by examiner

*Primary Examiner* — Vu A Nguyen
(74) *Attorney, Agent, or Firm* — Yee & Associates P.C.

(57) ABSTRACT

Methods and compositions directed to blends of acrylonitrile butadiene styrene (ABS) with styrene ethylene butadiene styrene (SEBS) are disclosed. In certain aspects, the blends further include an ultrahigh molecular weight polyethylene (UHMWPE). In a further aspect, the blends are compatible with 3D printing platforms.

3 Claims, 24 Drawing Sheets

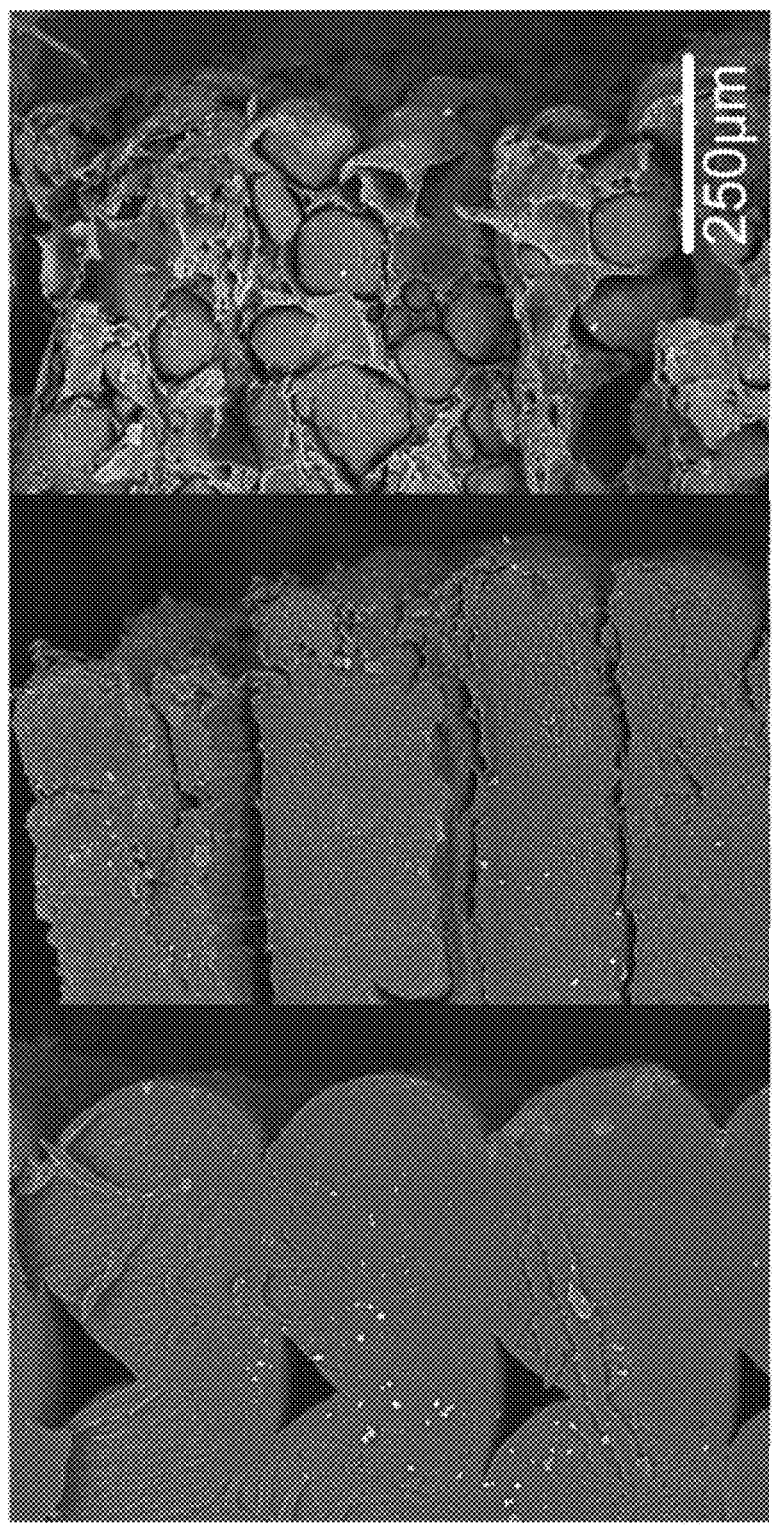

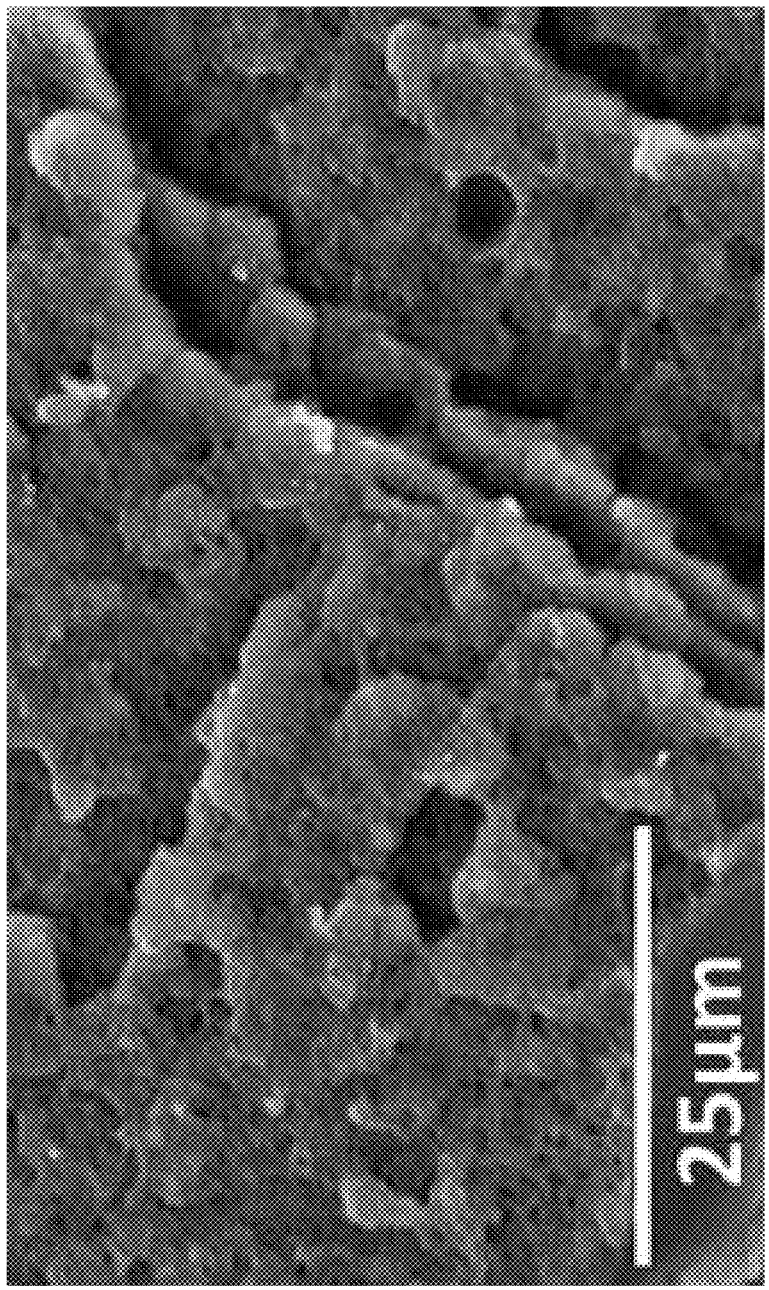

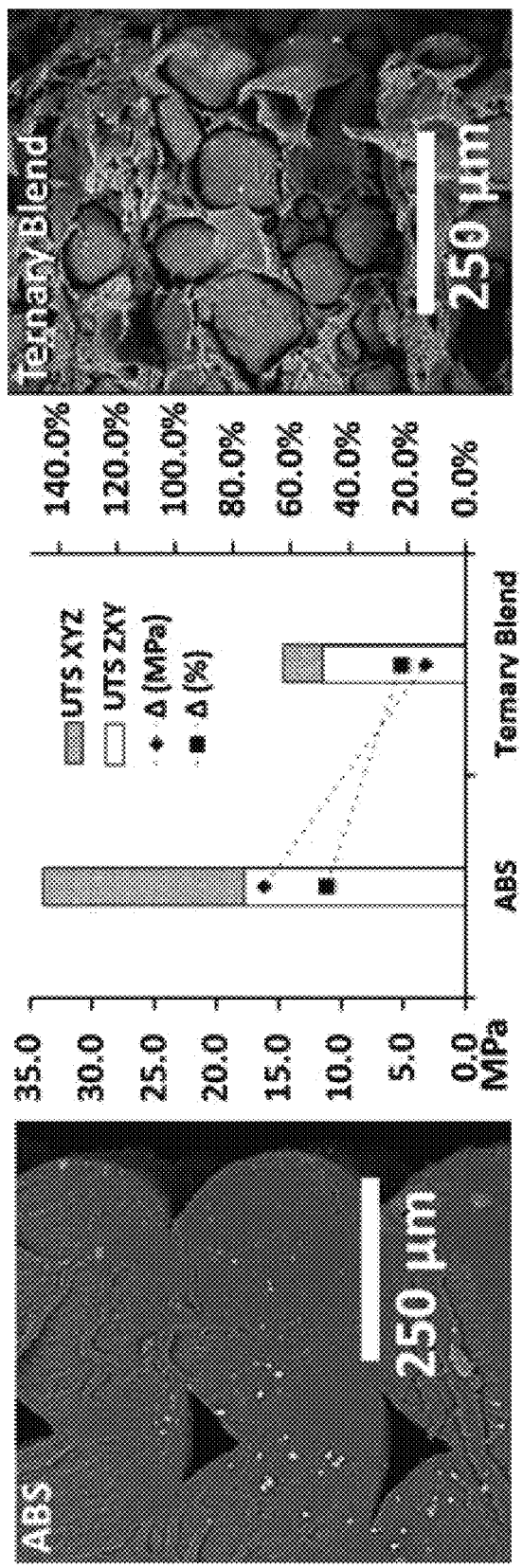

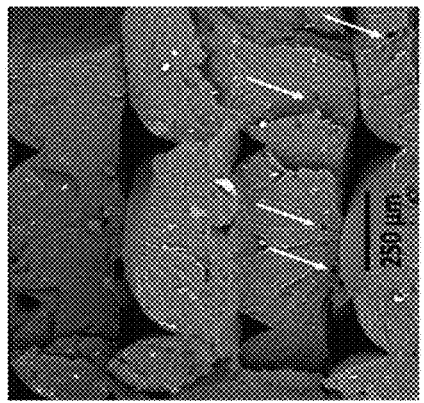
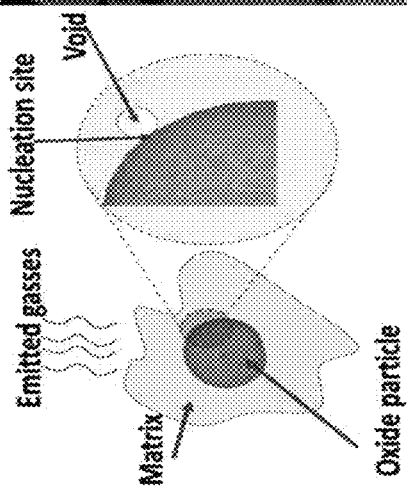
FIG. 13B
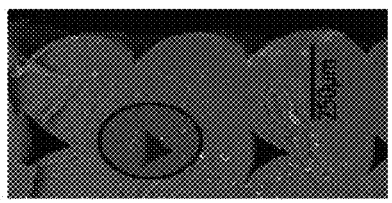
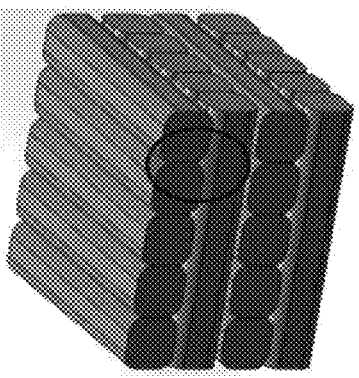
FIG. 13A

| Material | Melt Flow Rate (g/10min) | Test Load (kg) | Temperature (°C) |
|---|---|---|---|
| ABS MG47 | 7.42 | 3.8 | 230 |
| SEBS FX1901 GT | 15.72 | 3.8 | 230 |
| MG47 / 25% SEBS | 9.06 | 3.8 | 230 |
| MG47 / 50% SEBS | 23.25 | 3.8 | 230 |
| MG47 / 75% SEBS | 18.55 | 3.8 | 230 |

} Base resins

← Alloying

| Material | Melt Flow Rate (g/10min) | Test Load (kg) | Temperature (°C) |
|---|---|---|---|
| ABS MG94 | 14.83 | 3.8 | 230 |
| SEBS FX1901 GT | 15.72 | 3.8 | 230 |
| MG94 / 25% SEBS | 28.84 | 3.8 | 230 |
| MG94 / 50% SEBS | 27.48 | 3.8 | 230 |
| MG94 / 75% SEBS | 21.17 | 3.8 | 230 |
| MG94 / 90% SEBS | 15.35 | 3.8 | 230 |

} Base resins

← Alloying

FIG. 17

FIG. 18A
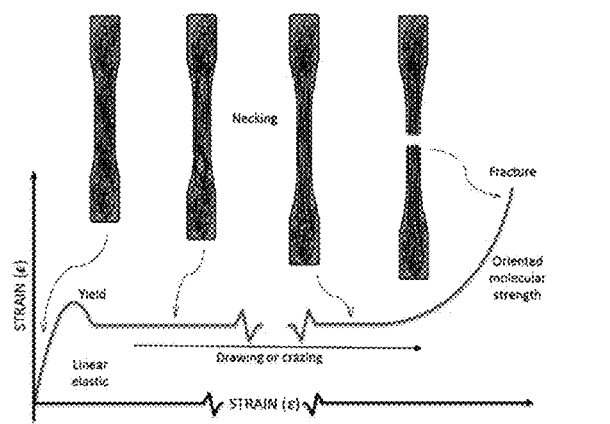
FIG. 18B
Between print rasters "weak" bonds are the primary bonding mechanism.
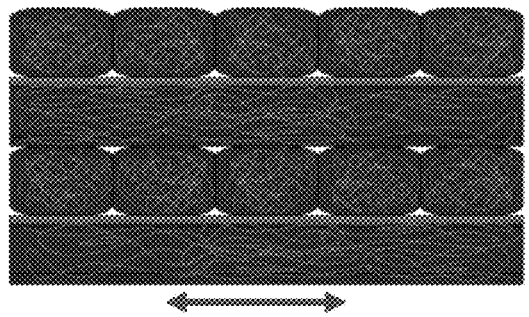
Some part of the specimen will fail where "strong" bonds must be overcome
Fracture surface indicates failure occurred completely within the inner-raster interface
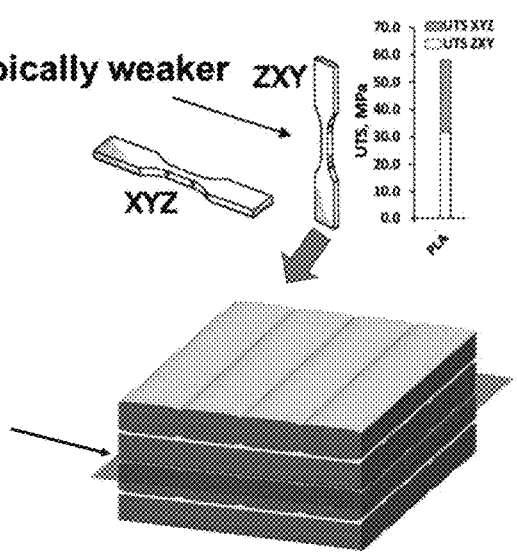
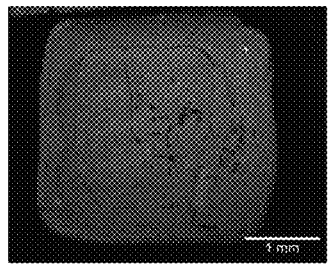
FIG. 18C

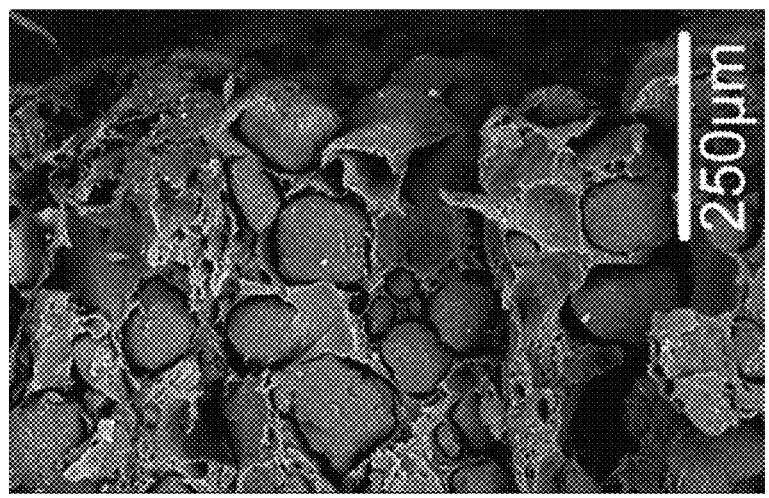
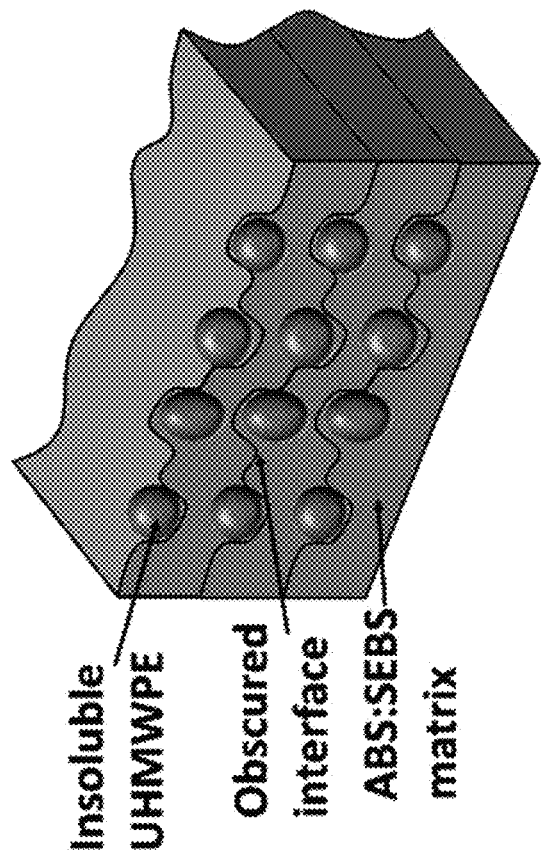
FIG. 20

FIG. 21A
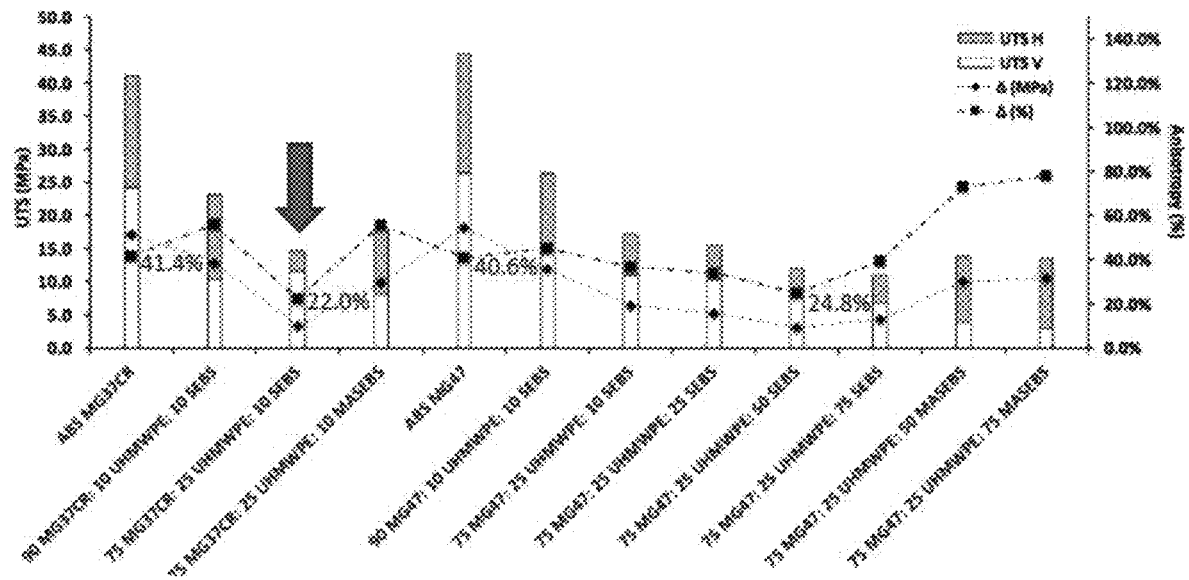
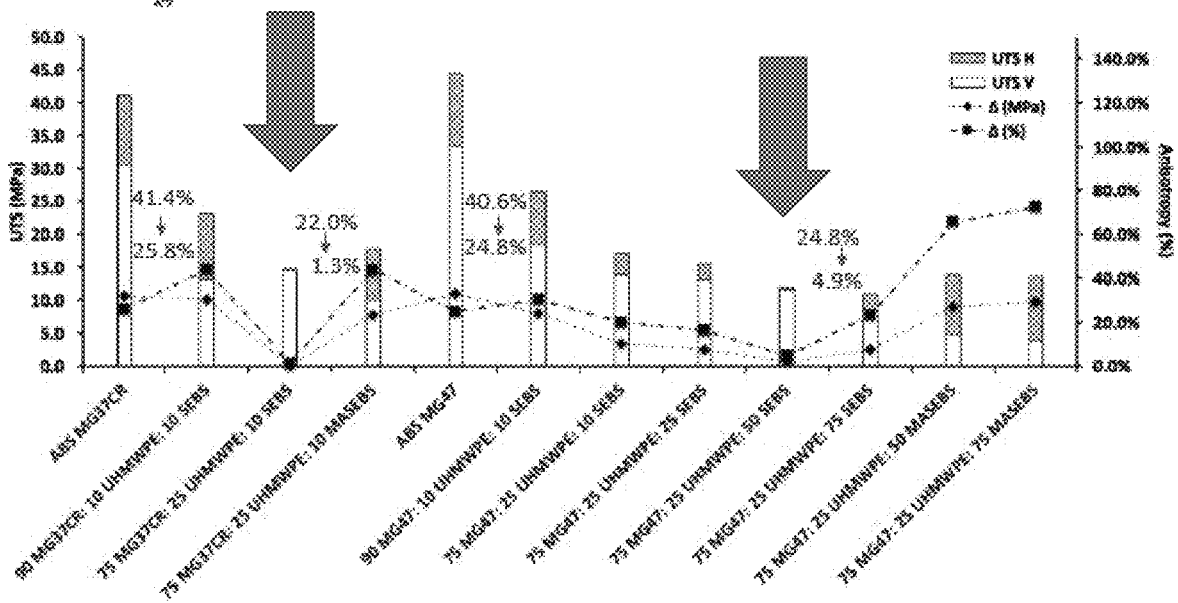
FIG. 21B

METHODS AND POLYMER COMPOSITIONS FOR MATERIAL EXTRUSION 3D PRINTING

CROSS-REFERENCE TO RELATED APPLICATIONS

This application is a continuation-in-part of pending U.S. application Ser. No. 14/960,247, filed on Dec. 4, 2015, incorporated herein by reference; which in turn claims priority from U.S. Provisional Patent Application No. 62/087,645, filed on Dec. 4, 2014, also incorporated herein by reference.

STATEMENT REGARDING FEDERALLY SPONSORED RESEARCH

This invention was made, to some extent, with government support under AFOSR Grant Nos. FA9550-14-0260 and FA9550-15-1-0312 awarded by the Air Force Office of Scientific Research. The U.S. government may have certain rights in the invention.

TECHNICAL FIELD OF THE INVENTION

The present disclosure relates generally to methods and compositions for material extrusion 3D printing (ME3DP). More particularly, the disclosure relates to methods and compositions for use of thermoplastic rubber (TPR) such as styrene ethylene butadiene styrene (SEBS) in an optimized ratio to generate toughened, rubberized acrylonitrile butadiene styrene (ABS) blends which are compatible with ME3DP platforms.

BACKGROUND

Material extrusion 3D printing (ME3DP) based on fused deposition modeling (FDM) technology is currently the most commonly used additive manufacturing method. In this 3DP process, a thermoplastic polymeric filament is deposited in a manner analogous to a glue gun in a layer-by-layer nature until a 3D object is created. However, ME3DP suffers from a limitation of compatible materials and typically relies upon amorphous thermoplastics, such as ABS.

A strategy to increase the number of materials available for material extrusion 3D printing is the blending of printable materials with other polymers in an effort to create materials which have different physical properties, yet maintain compatibility with existing material extrusion 3D printing platforms. There is a need for additional materials for use in existing 3D printing platforms.

SUMMARY

In view of the aforementioned problems and trends, general embodiments of the present disclosure provide methods and compositions for ME3DP using blends of styrene ethylene butadiene styrene (SEBS) and acrylonitrile butadiene styrene (ABS).

In one aspect of the disclosure, a polymer blend composition may have a ratio of ABS:SEBS between about 80:20 and about 50:50 by weight.

In another aspect of the disclosure, the composition is configured as a printable monofilament.

Yet another aspect of the disclosure teaches a composition that is a blend of acrylonitrile butadiene styrene (ABS), styrene ethylene butadiene styrene (SEBS), and ultrahigh molecular weight polyethylene (UHMWPE).

Specifically, in one other aspect, the blend comprises a ratio of ABS:UHMWPE:SEBS between 75:25:10 and 90:10:10 by mass.

Furthermore, the present disclosure teaches a method of blending acrylonitrile butadiene styrene with ultrahigh molecular weight polyethylene which involves the blending of acrylonitrile butadiene styrene with styrene ethylene butadiene styrene; and then adding ultrahigh molecular weight polyethylene to this blend.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 2A is a graph of the tensile test data (stress versus axial strain) depicting the effect of the addition of increasing percentages of SEBS (TP RUBBER) to ABS while

UHMWPE:SEBS, wherein FIG. 9B is a more magnified view of FIG. 9A and FIGS. 9C and 9D are 75:25:10 blends of ABS:UHMWPE:SEBS, wherein FIG. 10 is an SEM micrograph depicting the representative fracture surface of a tensile specimen printed from ABS, FIGS. 11A and 11C are a composite of black and white SEM micrographs comparing ABS only in FIG. 11A and a 75:25:10 ABS:UHMWPE:SEBS ternary blend in FIG. 11C, while FIG. 11B is a graphical representation of the ultimate tensile strength (UTS) of the ABS and the ABS:UHMWPE: SEBS 75:25:10 ternary blend of FIG. 11A and FIG. 11C, and FIGS. 12A-12B depict SEM images of cross sections of ABS only in FIG. 12A, a ABS:SEBS 50:50 blend in FIG. 12A (center) and a ABS:UHMWPE:SEBS 75:25:10 blend in FIG. 12A (right) while

FIGS. 13A-13B illustrates the two main causes of void formation in 3D printed structures wherein FIG. 13A depicts voiding due to print raster in an SEM image, and FIG. 13B depicts voids which manifest within the polymer matrix in an SEM image.

FIGS. 16A-16B are graphs depicting the percent elongation at break for 3D printed specimens, wherein FIG. 16A is the elongation data for ABS MG47 blended with FX1901 GT SEBS and FIG. 16B is the elongation data for ABS MG94 blended with FX1901 GT SEBS, FIG. 17 is an annotated table illustrating MFI results for the binary blends of ABS and SEBS disclosed herein, FIGS. 18A-18C depicts various aspects of the challenges overcome by the methods and compositions of the present disclosure, wherein FIG. 18A features the effects of strain on a specimen, while FIG. 18B emphasizes the effects on various bonds, and FIG. 18C depicts the resulting failure modes, FIG. 20 is an illustration and actual SEM of the polymer/polymer composite characteristics of the ternary blend of the present disclosure, FIG. 21A depicts the consolidated anisotrophy values for the ternary blends of the present disclosure and FIG. 21B depicts the consolidated anisotrophy values for these same ternary blends after application of a geometric correction factor.

NOTATION AND NOMENCLATURE

Figure 1:
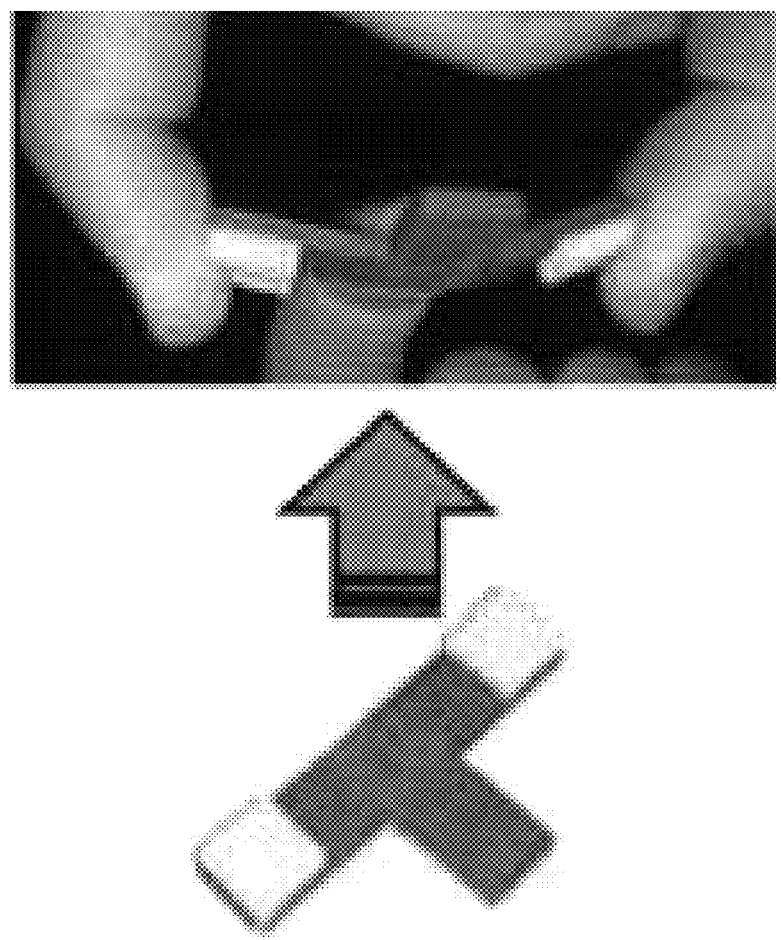
FIG. 1 is a black and white schematic illustrating a multi-material object created with the blend(s) [gray region between the white/ABS material] described herein in conjunction with ABS (white square material)
Figure 2B:
FIG. 2B is a schematic of the resulting flexible blend material using an optimized ratio of a 50/50 by weight percent blend of ABS/SEBS after 3D printing.
Figure 2A:
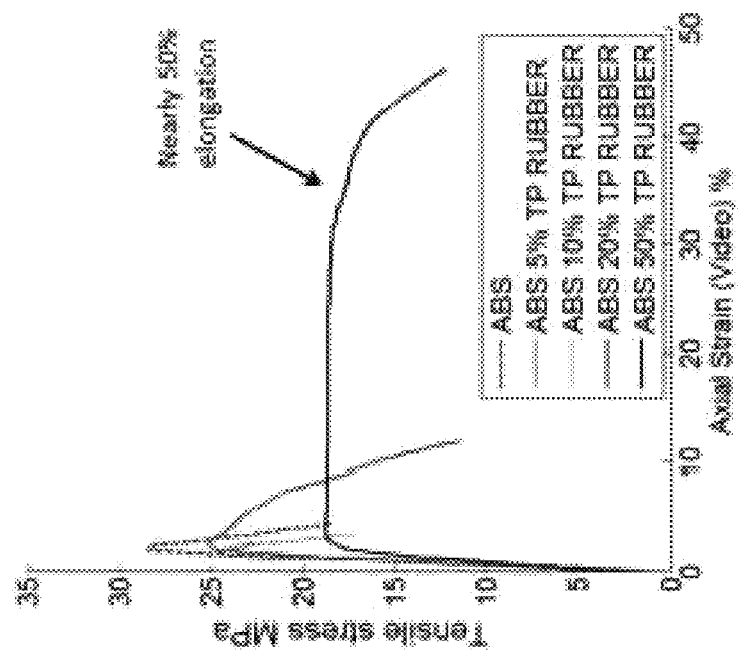
Figure 3:
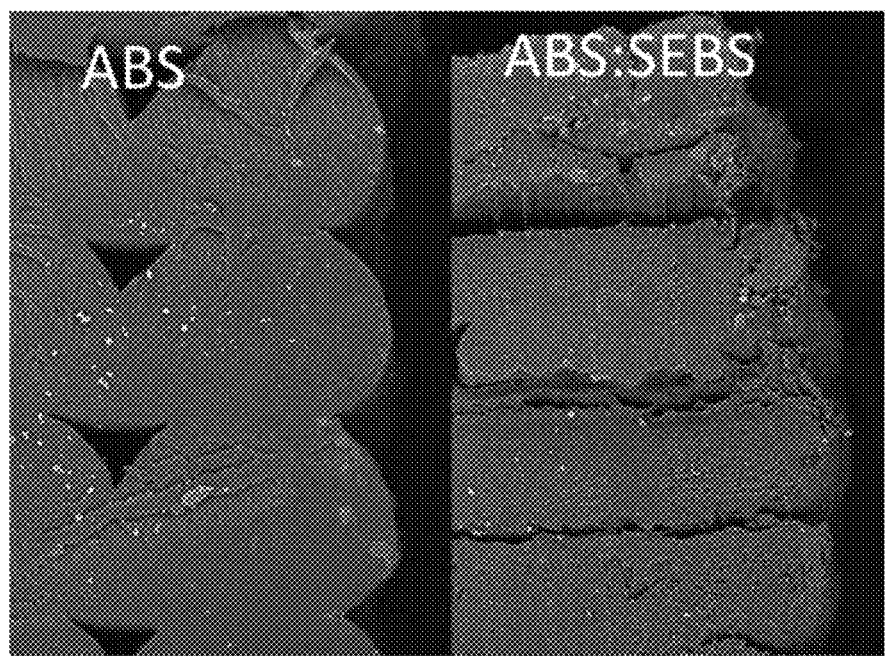
FIG. 3 is a composite of black and white scanning electron microscope (SEM) photographs depicting the rheological differences between an ABS and an ABS:SEBS blend disclosed herein.

Certain terms are used throughout the following description and claims to refer to particular system components and configurations. As one skilled in the art will appreciate, the same component may be referred to by different names. This document does not intend to distinguish between components that differ in name but not function.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Thus, they should be interpreted to mean "including, but not limited to . . . ."

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Material extrusion 3D printing (ME3DP) is a technology that relies upon the extrusion of a thermoplastic monofilament through a heated nozzle. Originally trademarked as fused deposition modeling (FDM™), there has been a dramatic increase in the use of this technology with rapid growth in the form of desktop models of various grades and do-it-yourself (DIY) kits due to the expiration of the original patents on the technology in 2009. As is the case with other 3D printing technologies, ME3DP presents many advantages over traditional manufacturing techniques, most notably direct computer aided design (CAD) to final part fabrication, the capability to print unique and complex geometries, and short design to product cycle time. The flexibility of ME3DP makes it an attractive manufacturing platform; however, the greatest limitation to this technology is a dependence on amorphous polymeric materials as a feedstock, limiting the amount of printable materials. The lack of a large variety of compatible materials limits the applicability of parts fabricated.

A strategy to increase the number of materials available to material extrusion 3D printing is the blending of printable materials with other polymers in an effort to create materials which have different physical properties, yet maintain compatibility with existing material extrusion 3D printing platforms.

This disclosure teaches a blended ABS with styrene ethylene butadiene styrene (SEBS) also known as thermoplastic rubber (TPR) which creates a rubberized (flexible), yet 3D printable material which can be used in commercially available 3D printers. Furthermore, the blend(s) described herein, in conjunction with ABS, have expanded the ability to create multi-material objects using such printers. While the disclosure herein uses SEBS in the examples, other TPR with similar properties may be used and are contemplated by this disclosure.

As examples, and in no way meant to limit the scope of the disclosure, a large universe of potential polymeric components that may be used in various weight percent blends, includes poly(lactic acid), acrylonitrile-butadiene-styrene triblock polymers, polycarbonate, polystyrene, high impact polystyrene, polycaprolactone, polyamides, thermoplastic polyurethanes, ethylene-vinyl acetate copolymers, styrene-butadiene-styrene triblock polymers, styrene-ethylene-butadiene-styrene copolymers, acrylic polymers, acrylate polymers, methacrylic polymers, methacrylate polymers, poly (methyl methacrylate), poly(butylene terephthalate), poly (ethylene terephthalate), polyethylene, poly(ethylene oxide), poly(hydroxybutyrate), styrenic polymers, poly(norbornene), polyoctenamer, poly(pentenamer), polypropylene), poly(propylene oxide), polyurea, polyurethane urea, poly(vinyl acetate), poly(vinyl alcohol), poly(vinyl butyral), poly(vinyl chloride), poly(vinyl fluoride), starch-based polymers, styrene-acrylonitrile copolymers, styrene-methylmethacrylate copolymers, siloxane polymers, and cellulose-based polymers.

Various binary and ternary blends can be used as a PMC to customize the physical and mechanical properties of the 3D products generated. As disclosed herein the ratios of each polymer in a binary blend can be modified. Similarly, the ratios of each polymer in a ternary blend may also be modified.

SEBS has been widely used as a "rubber toughening" agent for several polymer systems including nylon and polyethylene terephthalate (PET). Thus, use of SEBS achieved a toughened, rubberized ABS which was compatible with ME3DP platforms.

The polymer blending process has several advantages over synthesizing new printable polymers: i) by using known, printable materials as a base, the new blended materials are compatible with ME3DP platforms; and ii) polymer blending can be done away from large scale production facilities using small-batch polymer extruders, providing an expanding area for the development of new materials that meets the customer demand for personal 3D printing.

Figure 6:
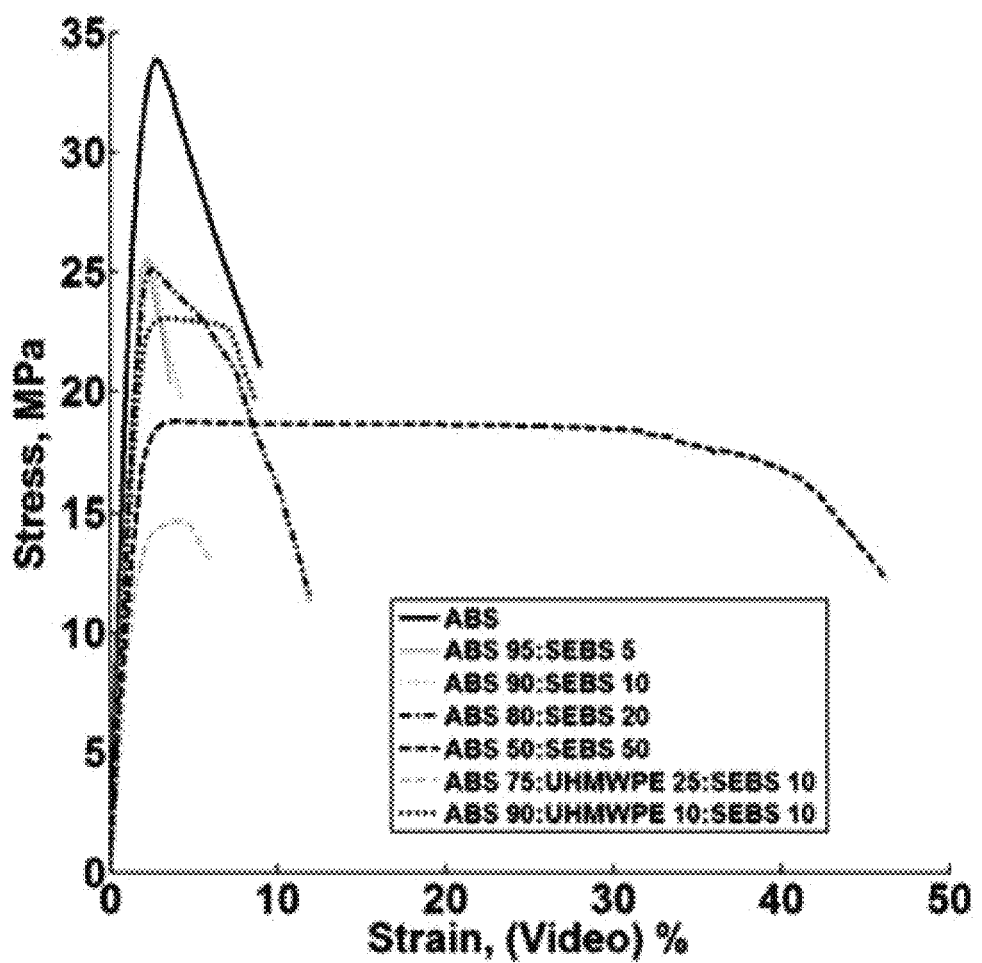
FIG. 6 is a composite of stress-strain diagrams generated from tensile test data for all material systems tested herein.
Figure 7A:
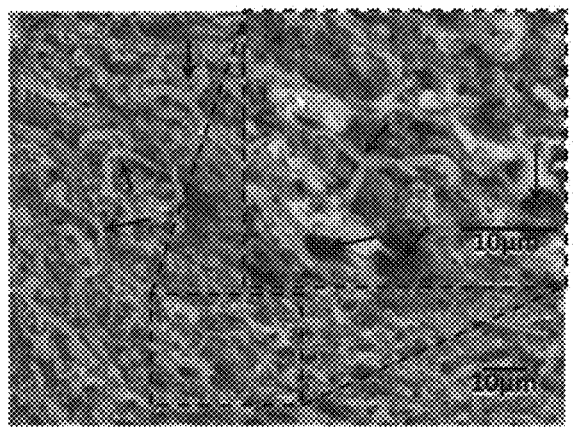
FIGS. 7A-7D depicts micrographs of various ABS:SEBS blends wherein the proportion of ABS:SEBS are 95:5 in FIG. 7A, 90:10 in FIG. 7B, 80:20 in FIG. (C, and 50:50 in FIG. 7D, FIGS. 8A-8C are a composite of black and white SEM micrographs comparing ABS only in FIG. 8(A), to a 50:50 ABS:SEBS blend in FIG. 8B, and to a 75:25:10 ABS: UHMWPE:SEBS ternary blend in FIG. 8C, FIGS. 9A-9D are a composite of black and white SEM micrographs comparing various blends of ABS:UHMWPE: SEBS.
Figure 7B:
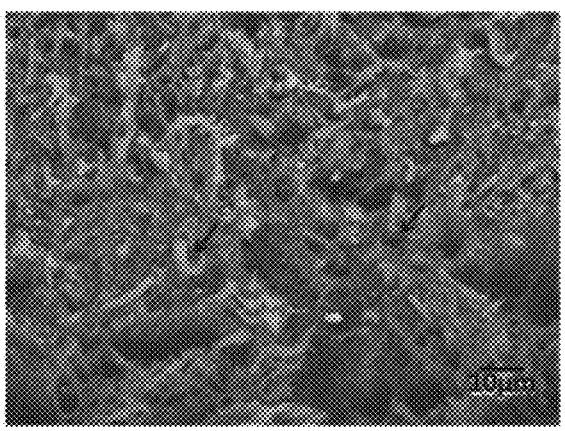
Figure 7C:
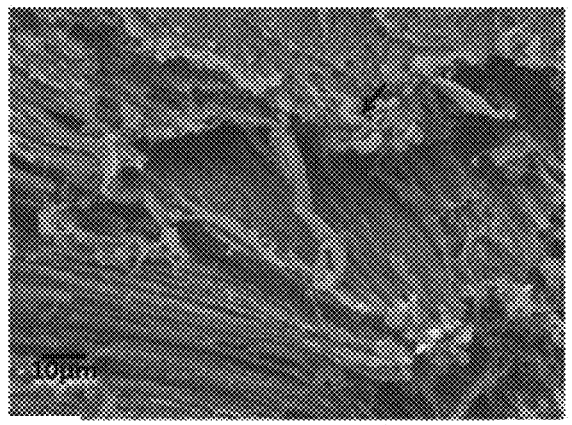
Figure 7D:
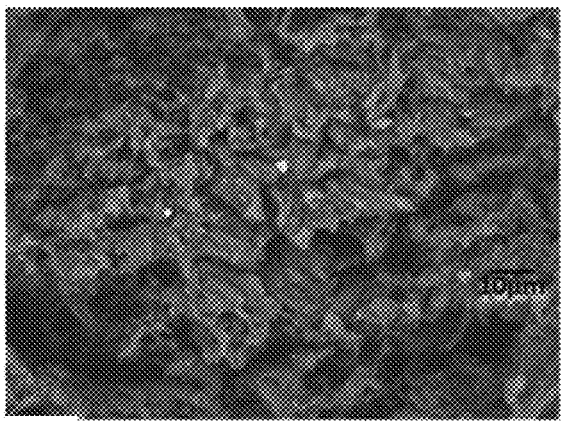

In one aspect of the disclosure of a binary blend, SEBS in an optimized ratio of 50/50 by weight percent is used to generate toughened, rubberized ABS compatible with ME3DP platforms as depicted in the graph of FIG. 6. Note the difference in mechanical properties as compared with the base ABS resin. Most notable is the drastic increase in toughness for the 50% by weight of the ABS/SEBS blend.

Certain aspects are directed to a 3D-printable monofilament compatible with material extrusion 3D printers at a maximum of (or less than) 50% by weight SEBS. However, blends with ratios varying from the approximately 50% by weight SEBS are also contemplated as potentially adaptable for use in ME3DP.

There are rheological differences in the 50/50 blend and there is a blending between rasters in the 3D printed part that leads to a smoother surface finish (FIG. 8). The blending of polymer matrix composites where the matrix material is a blend described herein produce a blend(s) having a lower propensity to manifest gas voids. Thus, while an approximately 50% blend is described, other percentages and ratios are contemplated and examples describing a 50/50 blend should in no way limit the scope of this disclosure.

As noted herein, certain embodiments are directed to blends of acrylonitrile butadiene styrene (ABS) with styrene ethylene butadiene styrene (SEBS). These blends may further comprise an ultrahigh molecular weight polyethylene (UHMWPE). These ternary blends are also compatible with current 3D printing platforms. In certain aspects compositions described herein can provide for production of a smooth surface finish of 3D printed inclined panes as well as providing decreased mechanical anisotropy to a printed article.

For example, one type of UHMWPE known as TIVAR® 1000 is an engineered polymers with a unique combination of wear and corrosion resistance, low friction surface and impact strength. TIVAR® 1000 is resistant to chemical attack and moisture absorption, and retains key physical properties to −30° C. It also meets FDA, USDA and 3-A Dairy guidelines for food processing and handling. The properties of TIVAR® 1000 may be further modified using methods known in the art, to create UV stabilized and anti-static blends. Custom colors compounded with FDA/

USDA approved pigments, which meet FDA and USDA guidelines for food processing and handling may also be added to such blends to expand uses in the food, agricultural and pharmaceutical industries. Thus, the exemplary use of ABS, SEBS and UHMWPE should not be used to limit the scope of this disclosure.

However, other printable polymer blends, such as commercially available amorphous polymer blends such as PCABS (polycarbonate and ABS) and Ultem 9085 (polycarbonate and polyetherimide), which are both marketed by Stratasys, may also be used in the novel blends and are contemplated to be within the scope of this disclosure.

The present disclosure teaches novel ABS-based polymeric blends which are compatible with ME3DP, yet have physical properties that are different from pure ABS. Further novelty is derived from the use of the styrene ethylene butadiene styrene (SEBS) copolymer as both a blend with ABS and a compatibilizer agent in the blending of ABS with UHMWPE—a material that is semicrystalline and neither extrudable (without specialized equipment) nor compatible with ME3DP platforms. The use of SEBS as a compatibilizer for blends of polystyrene (PS) and high density polyethylene (HDPE) has been demonstrated in the art and the present disclosure utilizes the copolymer block to blend the similar materials ABS and UHMWPE. It is anticipated that other copolymers which function similarly may be used to develop other ternary blends.

The present disclosure focuses broadly on altering the physical properties of printable base polymers (in this case ABS) for use in 3D printing through the addition of UHMWPE and the thermoplastic elastomer SEBS. Utilizing and optimizing these three polymeric materials can create unique combinations of properties, based on the individual constituents.

For example, ABS is based on three monomers (acrylonitrile, butadiene, and styrene). Of particular interest are the acrylonitrile and butadiene groups, the former is responsible for forming polar bonding between the chains (producing a stronger material) and the latter provides better mechanical resilience. Likewise, UHMWPE offers high toughness, wear and abrasion resistance, and impact strength. However, because UHMWPE is not compatible with most extrusion equipment and therefore, must be blended with other polymers for 3D printing, it lacks the melt flow capability required for printing, even above the melting temperature.

In comparison, polymeric elastomers such as SEBS have properties including low melt viscosity, low process temperature, and low distortion during extrusion. Also, SEBS has demonstrated high impact strength and high elongation at break.

Based on the properties of the components, blends are taught with properties suitable for a wide variety of uses in 3D printing. For example, a blended system of SEBS and ABS increases the elastomeric properties and toughness of ABS. Also, by incorporating a combination of SEBS and UHMWPE to ABS, the benefits of UHMWPE (toughness) supplement the properties of ABS and SEBS (printability and relatively low process temperature). To this end, two blend types were fabricated (ABS:SEBS and ABS:SEBS:UHMWPE) to take advantage of these properties and enhance the properties of one of the most common 3D printing materials, ABS.

Acrylonitrile butadiene styrene (ABS) (chemical formula $(C_8H_8)x(C_4H_6)y(C_3H_3N)z$) is a common thermoplastic polymer. Its glass transition temperature is approximately 105° C. (221° F.). ABS is amorphous and therefore has no true melting point. ABS is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene criss-crossed with shorter chains of polystyrene-co-acrylonitrile. The nitrile groups from neighboring chains, being polar, attract each other and bind the chains together, making ABS stronger than pure polystyrene. The polybutadiene, a rubbery substance, provides resilience even at low temperatures. For the majority of applications, ABS can be used between −20 and 80° C. (−4 and 176° F.) as its mechanical properties vary with temperature. In certain aspects compositions or blends described herein can comprise ABS in a weight percent of at least, at most, or about 90, 85, 80, 75, 70, or 65 weight percent.

Styrene-ethylene-butadiene-styrene (SEBS) is commercially available from Shell Chemical Company under the trademark KRATON G™. Styrene-ethylene-butadiene-styrene block copolymers (SEBS) can be composed of 10 to 70% by weight of polystyrene blocks and 30 to 90% by weight of ethylene-butadiene blocks. In certain aspects compositions or blends described herein can comprise SEBS in a weight percent of at least, at most, or about 20, 25, 30, 35, 40, 45, or 50% weight percent.

In certain aspects UHMWPE is a linear polyethylene with less than one side chain per 5,000 carbon atoms, or less than one side chain per 10,000 carbon atoms, or less than one side chain per 15,000 carbon atoms, or less than one side chain per 20,000 carbon atoms, wherein the side chain preferably contains at most 10 carbon atoms. In certain aspects compositions or blends described herein can comprise UHMWPE in a weight percent of at least, at most, or about 20, 25, 30, 35, 40, 45, or 50% weight percent. In certain aspects UHMWPE is present in a blend or composition at a ratio of at least or about 25:75 weight percent UHMWPE:ABS Certain aspects are directed to binary and ternary polymeric blends for ME3DP. In certain aspects a composition, e.g., blend, is produced by combining components using a twin screw compounding process. In certain aspects the blend will be about 80, 70, 60, 50 parts by weight ABS to 20, 30, 40, 50 SEBS parts by weight, including all values and ranges there between. In a further aspect the blend is 80:20, 70:30, 60:40, or 50:50 ABS:SEBS by weight.

In other aspects the blend comprises ABS, SEBS, and UHMWPE. In certain aspects the blend will comprise a mass ratio of ABS:UHMWPE:SEBS of about 90, 85, 80, 75 weight percent ABS, including all values and ranges there between; about 25, 20, 15, 10 weight percent UHMWPE, including all values and ranges there between; and about 5, 10, 15 weight percent SEBS, including all values and ranges there between. In certain aspect the mass ratio of ABS:UHMWPE:SEBS is about 90:10:10, 85:15:10, 80:20:10 or 75:25:10, including all values and ranges there between.

Other embodiments are directed to a process of blending UHMWPE with ABS using SEBS as a compatibilizer. A compatibilizer as used herein is a substance used to stabilize blends of immiscible polymers. A compatibilizer is often added to blends of immiscible polymers to reduce the interfacial tension between them. Compatibilizers have also been employed to improve wet out or coupling of polymers and additives or fillers in composite materials. In both cases, the addition of compatibilizer can result in improved processing and mechanical properties of the resulting blend or composite. Functionalized copolymers are a class of materials applied as compatibilizers. In general, functionalized copolymers are polymers that have some form of reactive functional groups incorporated throughout the polymer backbone.

Mechanical testing and fractography were used to characterize the different physical properties of the blend(s) described herein. Though the blends described herein possess different physical properties, compatibility with ME3DP platforms is maintained. Also, a decrease in surface roughness of a standard test piece was observed for certain blends as compared with ABS.

Different blends of ABS were made with varying weight percentages of SEBS: 5, 10, 20, and 50% (in terms of ABS:SEBS ratio 95:5, 90:10, 80:20, and 50:50) and compared with baseline samples created from ABS.

EXAMPLES

The following examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 4C:
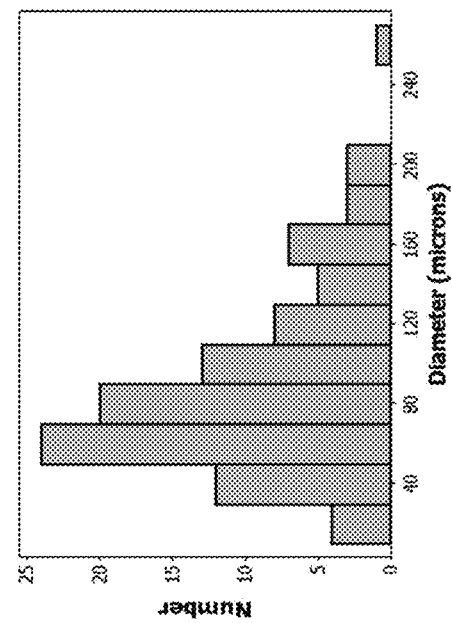
FIGS. 4A and 4B are black and white SEM photographs of the (a) SEBS and (b) UHMWPE polymer before compounding. The size distribution of the UHMWPE polymer is depicted in the graph in FIG. 4C.
Figure 4B:
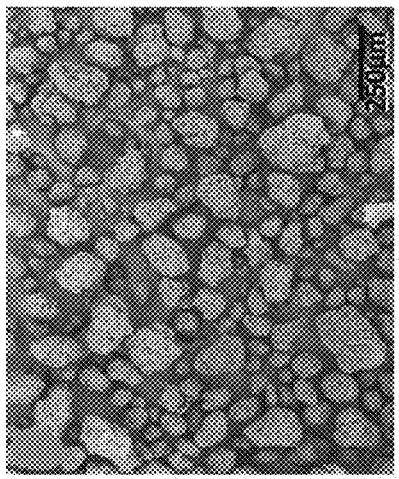
Figure 4A:
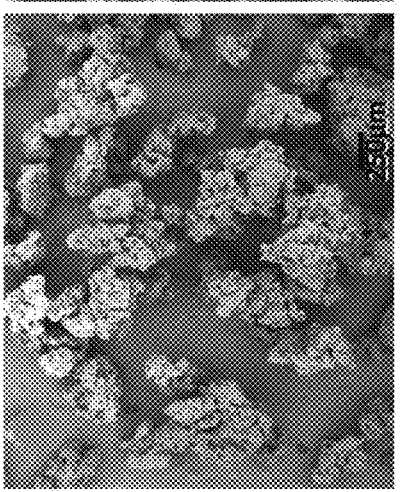

ABS/UHMWPE/SEBS blends—Blends of UHMWPE with ABS using SEBS as a compatibilizer were made using GUR® 1020 UHMWPE (Celeanese, Irving, Tex.) blended with the same ABS and SEBS materials mentioned above. The UHMWPE was in powder form with a size distribution as determined by plotting data on the graph in FIG. 4C. The size distribution of the UHMWPE polymer was measured to be 92.6±45 µm. The ternary blends tested in this study were based on mass ratios of ABS:UHMWPE:SEBS of 90:10:10 and 75:25:10.

A printable monofilament was created when the weight percent of UHMWPE was greater than 25% compared with the ABS base (greater than an ABS:UHMWPE ratio of 75:25). The mixtures were fed to the same twin screw extruder/compounder; however, the operating parameters used for these blends were at a temperature of 195° C., under a pressure of 72 bar, and a screw rate of 40 rpm. In contrast to both blend systems, the pure ABS filament was created using extrusion parameters at a temperature of 175° C., under a pressure of 54 bar, and a screw rate of 50 rpm. All extrusion parameters for the various blends are shown in Table I, and it should be noted that the difference in physical properties necessitated different extrusion parameters which were determined empirically.

TABLE I

Extrusion parameters for the blended materials.

| Material | T zone 1 (° C.) | T zone 2 (° C.) | T zone 3 (° C.) | T zone 4 (° C.) | T zone 5 (° C.) | RPM main screw | RPM feed screw (% main) | Pressure (P) main screws (bar) | Load (%) |
|---|---|---|---|---|---|---|---|---|---|
| ABS:SEBS | | | | | | | | | |
| 1:0 | 170 | 182 | 187 | 187 | 187 | 35 | 6 | 100 | 72 |
| 95:5 | 170 | 182 | 187 | 187 | 187 | 35 | 6 | 100 | 72 |
| 90:10 | 170 | 182 | 187 | 187 | 187 | 35 | 6 | 92 | 68 |
| 80:20 | 165 | 170 | 170 | 170 | 170 | 55 | 6 | 73 | 64 |
| 50:50 | 160 | 165 | 165 | 165 | 165 | 70 | 6 | 45 | 61 |
| ABS:UHMWPE:SEBS | | | | | | | | | |
| 75:25:10 | 155 | 185 | 185 | 185 | 185 | 40 | 6 | 80 | 62 |
| 90:10:10 | 155 | 195 | 195 | 195 | 190 | 40 | 6 | 72 | 60 |

Figure 5B:
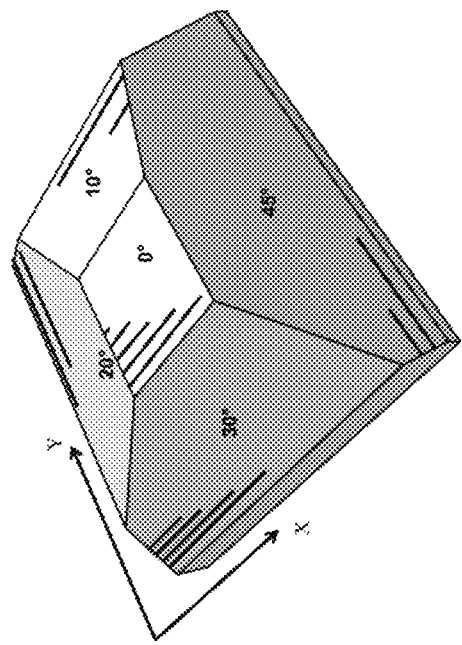
FIG. 5A is illustrates a schematic diagram of a Type V tensile test specimen where the raster direction is designated by arrows and hash marks. The structure depicted in FIG. 5B was designed to test surface roughness with surface angles at 10°, 20°, 30°, and 45° with respect to the surface normal.
Figure 5A:
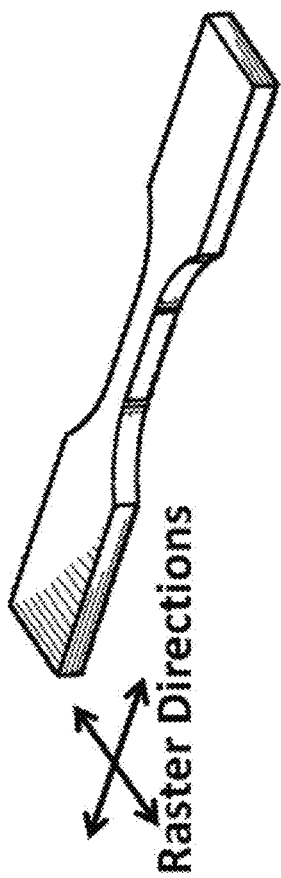

Materials testing and characterization—The blended materials underwent tensile testing following the ASTM Standard D638-10 using the Type V dimensions. To verify commercial printability, these samples were printed using a MakerBot Replicator material extrusion 3D printer. The print direction of the dog-bone structures was in the XYZ direction as depicted in FIG. 5A with a raster height of 0.4 mm and a raster width of 0.4 mm. The raster path was set to produce a maximum filling percentage. A slight modification was made to the MakerBot Replicator; the stock drive gear was replaced with a "hyena" gear as it was found this gear works better with the blended polymer filaments. Additionally, a modified nozzle with a diameter of 0.8 mm was used to print some of the blends as seen in Table II. Machine printing parameters used for each material are listed in Table II and, as was the case with the extrusion process, the 3D printing process demanded different properties based on the material type. The tensile test specimens were subjected to loading using an Instron® 5866 tensile tester, and the resulting stress, strain, and average Young's modulus were recorded.

ture is indicative of an increase in toughness over the original ABS base resin. The stress-strain data for all blends are represented graphically in FIG. 6. Each stress-strain curve is a composite curve of every tested sample for a given blend. The data compiling to generate the curves was achieved by a process described in the study of Torrado et al. where a MatLab®-based program was used. By comparing the elongation percentage before failure, it is possible to observe the difference in toughness for the new polymeric blends as compared with the base ABS resin. It is important to note that though there were differences in the mechanical

TABLE II

MakerBot print parameters for all materials.

| Material | Object infill (%) | Layer height (mm) | No. of shells | Feed rate (mm's) | Travel feed rate (mm's) | Print Temperature (° C.) | Filament Diameter (mm) | G-code nozzle Diameter (mm) | Actual nozzle Diameter (mm) | Raft |
|---|---|---|---|---|---|---|---|---|---|---|
| ABS:SEBS | | | | | | | | | | |
| 1:0 | 100 | 0.27 | 1 | 40 | 55 | 230 | 1.9 | 0.4 | 0.4 | No |
| 95:5 | 100 | 0.27 | 1 | 40 | 55 | 230 | 1.9 | 0.4 | 0.4 | No |
| 90:10 | 100 | 0.27 | 1 | 40 | 55 | 240 | 1.9 | 0.6 | 0.8 | No |
| 80:20 | 100 | 0.20 | 1 | 40 | 55 | 240 | 1.9 | 0.6 | 0.8 | No |
| 50:50 | 100 | 0.20 | 1 | 40 | 55 | 240 | 1.9 | 0.6 | 0.8 | No |
| ABS:UHMWPE:SEBS | | | | | | | | | | |
| 75:25:10 | 100 | 0.20 | 1 | 40 | 55 | 230 | 1.9 | 0.6 | 0.8 | No |
| 90:10:10 | 100 | 0.20 | 1 | 40 | 55 | 230 | 1.9 | 0.6 | 0.8 | No |

Fracture surfaces of representative specimens from each sample pool were analyzed with a Hitachi TM-1000 scanning electron microscope (SEM) operating at a 15 kV accelerating potential and equipped with a backscatter electron (BSE) detector. SEM imaging allowed fracture surface morphology observations of the blended structures to identify common failure modes within these new material systems. As the goal of this paper was to demonstrate the development of new polymeric blends, a test to measure the printability of the material beyond the printing of mechanical testing specimens was developed. A test structure designed to test the ability to print an inclined plane was developed with surface angles at 10°, 15°, 30°, and 45° with respect to the normal surface of the XY plane as illustrated in FIG. 5B. The specific angles were chosen based on precedence set in the literature. Surface roughness measurements were taken using a Mitutoyo surface roughness tester and were also made on the flat top surface and bottom surface of the test piece (0° top and 0° bottom in the x and y direction).

Results with ABS/SEBS blends—The results of the mechanical testing data are shown in Table III below. As can be seen, blends that were 5% and 10% by weight SEBS (the 95:5 and 90:10 ABS:SEBS blends) do not exhibit an improvement in mechanical properties and suffered from a slight decrease in ultimate tensile strength (UTS) of 25.5±2.3 and 26.2±2.5 MPa for 5% and 10% SEBS as compared with UTS of 34.0±1.74 MPa for the baseline ABS samples. The blends with 20% and 50% by weight SEBS (the 80:20 and 50:50 ABS:SEBS blends) also displayed a lower UTS (18.0±0.03 MPa); however, there was a dramatic increase in the percentage of elongation at the breaking strength where the 20% SEBS blend 50% SEBS blend displayed elongation percentage values of 11.9±2.1% and 47.6±5.0% compared with 8.6±3.3% for the baseline ABS specimens. The increase in plastic deformation before fracproperties of the blends, the materials were still compatible with the ME3DP platform disclosed herein.

TABLE III

Mechanical testing data for all material tested in this study.

| Material | UTS (MPa) | Elongation at break (%) |
|---|---|---|
| ABS:SEBS | | |
| 1:0 | 34.0 ± 1.74 | 8.6 ± 3.3 |
| 95:5 | 25.5 ± 2.3 | 3.6 ± 0.7 |
| 90:10 | 26.2 ± 2.5 | 4.0 ± 1.1 |
| 80:20 | 25.2 ± 1.8 | 11.9 ± 2.1 |
| 50:50 | 18.0 ± 0.03 | 47.6 ± 5.0 |
| ABS:UHMWPE:SEBS | | |
| 75:25:10 | 14.7 ± 0.7 | 5.7 ± 0.7 |
| 90:10:10 | 23.1 ± 0.8 | 8.4 ± 1.0 |

Sample size, n = 5

Scanning electron microanalysis of the fracture surfaces from representative specimens from each blend sample pool revealed different characteristics based on the weight percentage of SEBS in the blend. In general, the fracture surface of the tensile specimens is indicative of craze cracking which propagated normal to the direction of applied stress as has also been demonstrated in the literature. The prominent features of the fracture surface for the 5% and 10% by weight SEBS blends are the presence of fibrils (FIG. 7). The fracture surfaces of the tensile specimens are indicative of craze cracking, and all fracture surfaces prominently display fibrils, highlighted by black arrows in FIGS. 7A, 7B, and 7C.

These fibrils appear to have torn out of the surrounding matrix, and they decrease in number as the concentration of SEBS increases. In terms of miscibility, this may indicate that ABS is miscible in SEBS because an increase in SEBS concentration corresponds to a decrease in fibrils present.

Also, an increase in SEBS concentration causes a shift in the mechanical behavior of the tensile specimens toward a material that is more elastic than ABS alone.

The ABS blends with a concentration of 20% and 50% SEBS were qualitatively different in terms of surface smoothness than the samples printed from pure ABS. These two SEBS blends were subjected to surface roughness testing utilizing the printed test piece discussed above in FIG. 5B and the results are shown in Table IV. As can be seen in the table, the 50% SEBS blend led to the printing of smoother 45° and 30° degree surfaces as compared with the sample printed from ABS. The reason for the improvement in surface roughness for inclined planes is due to the unique characteristics in the way the material is deposited during the printing process that is influenced by the rheological differences between the material systems. As is seen in the SEM images of cross sections from samples printed from selected blends in this study (FIG. 8), the filament shape is still discernable for the sample printed from ABS while the 50:50 ABS:SEBS blend deposits differently. The difference in deposition morphology allows for the creation of smoother inclined planes. The other surfaces of the ABS test piece were comparable for the blends tested.

Figure 9A:
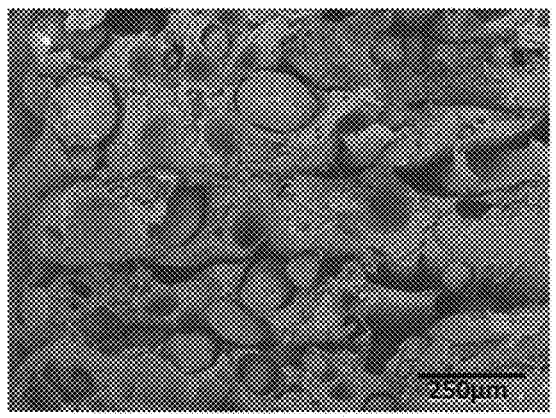
FIGS. 9A and 9B are 90:10:10 blends of ABS.
Figure 9B:
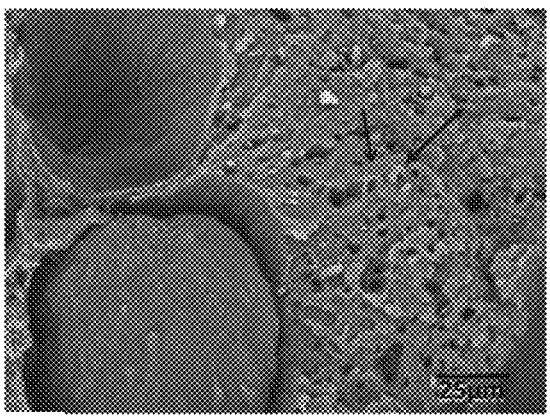
Figure 9C:
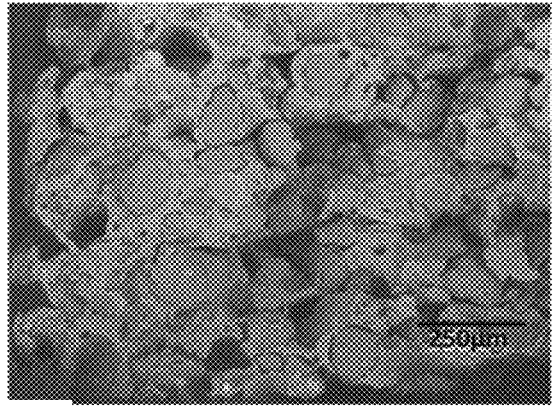
FIG. 9D is a more magnified view of FIG. 9C.
Figure 9D:
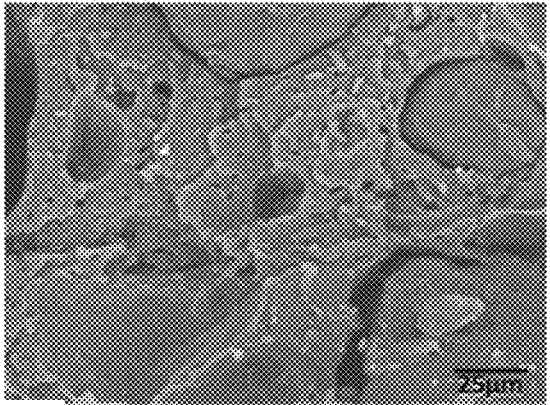

The ternary blend has the propensity to deposit in a more spread out fashion than the other blends to the point that it is difficult or impossible to discern the deposition layers as can be seen when one compares the print rasters near the edges of specimens for ABS [FIG. 8A], the 50% SEBS blend [FIG. 8B], and the 75:25:10 ternary blend [FIG. 8C]. From the images, it can be seen that in all cases, the roughness in the x direction was less than that in the y direction due to the fact that in the y direction the test probe traveled against the print raster direction while measurements in the x direction were parallel with the print raster direction. Once again, though the material displayed different mechanical properties as compared with ABS, the inventors were still able to use it as the feedstock on their ME3DP platform. Note that in FIG. 8C the 75:25:10 ABS:UHMWPE:SEBS ternary blend has a propensity to blend raster layers leading to an overall smoother surface finish for inclined planes.

consistent in size with undissolved UHMWPE. At higher magnifications in FIGS. 9B and 9D the undissolved UHMWPE appear to be pulled out of the composite matrix and free-to-move after testing, in addition to have undergone melting.

Analysis of the micrographs confirmed prominent globules of the material in both ternary blends. Comparing the size of the globules to the size distribution of the UHMWPE powder confirms that the globules are most-likely undissolved UHMWPE particles. The surface features of the globules are much smoother than the original powder and are most likely due to particle melt during the extrusion process as the process was above the melting temperature ($T_m$ 130° C.) of UHMWPE. The particles also appear to pull out of the matrix as there are several cavities and free-to-move particles on the fracture surface. The fracture morphology of the matrix material is more brittle than even the comparable mixtures of ABS and SEBS meaning that it is possible that some of the UHMWPE did dissolve into the ABS matrix or that the SEBS mixed with the UHMWPE as the fracture surface of the matrix resembles the fracture surface of pure ABS (FIG. 10). Also present in the fracture surface of both ternary blends are fibrils and voids where the fibrils pulled out [highlighted by black arrows in FIG. 9B]. The mechanics of the fibril tear out is more prominent in these figures than in the ABS:SEBS blend images and may point to a threshold of miscibility between SEBS and ABS.

Surface roughness measurements (Table IV) show that for inclined surfaces, the 75:25:10 ternary blend produced the smoothest surfaces of all materials tested in this study whereas the flat surfaces were among the roughest tested here. As was the case with the 50:50 ABS:SEBS blend, one reason for the smoother inclined planes may be the rheological differences for this blend as compared with the others. As depicted in FIG. 11A)/ABS and FIG. 11C/ternary blend, the rheological differences of the ternary blend as compared to ABS obscure the print rasters leading to a decrease in build orientation-caused mechanical property anisotropy.

TABLE IV

Surface roughness measurements (Ra in μm) for selected materials.

| Material | 45° | 30° | 15° | 10° | 0° top x | 0° top y | 0° bottom x | 0° bottom y |
|---|---|---|---|---|---|---|---|---|
| ABS:SEBS | | | | | | | | |
| 1:0 | 47.2 ± 8.6 | 49.8 ± 5.4 | 62.9 ± 3.6 | 50.7 ± 5.8 | 9.7 ± 2.7 | 33.9 ± 4.3 | 1.06 ± 0.2 | 5.56 ± 5.8 |
| 80:20 | 44.8 ± 2.4 | 49.0 ± 1.7 | 59.4 ± 2.6 | 47.6 ± 12.4 | 13.0 ± 4.0 | 17.1 ± 7.3 | 1.8 ± 1.3 | 1.8 ± 0.7 |
| 50:50 | 35.9 ± 0.7 | 38.8 ± 4.7 | 64.5 ± 1.4 | 52.2 ± 13.3 | 11.3 ± 3.0 | 16.9 ± 5.9 | 1.5 ± 0.5 | 2.8 ± 1.8 |
| ABS:UHMWPE:SEBS | | | | | | | | |
| 75:25:10 | 29.7 ± 6.0 | 47.0 ± 7.6 | 40.9 ± 10.1 | 36.0 ± 11.3 | 18.5 ± 6.7 | 34.0 ± 4.1 | 20.4 ± 5.4 | 23.8 ± 6.8 |
| 90:10:10 | 47.9 ± 9.9 | 40.2 ± 5.2 | 44.5 ± 2.9 | 29.9 ± 4.7 | 13.3 ± 2.9 | 28.6 ± 4.3 | 3.8 ± 0.9 | 3.9 ± 1.5 |

ABS/UHMWPE/SEBS blends—Mechanical testing data for the two ternary blends tested here are listed in Table III. In both blended cases, the material's UTS was weaker than ABS. The average UTS for the ABS:UHMWPE:SEBS (75:25:10) blend was 14.7±0.7 MPa while the ABS:UHMWPE:SEBS (90:10:10) blend produced samples with an average UTS of 23.1±0.8 MPa, as compared with 34.0±1.74 MPa for the baseline ABS samples.

The electron micrographs of the fracture surfaces of representative samples for the two ternary blends (ABS:UHMWPE:SEBS—75:25:10 and 90:10:10) examined in this study are depicted in FIG. 9. Large globules are of FIG. 11B depicts the decrease in ultimate tensile strength anisotropy between ABS and the 75:25:10 ABS:UHMWPE:SEBS ternary blend, for specimens 3D printed in the XYZ and ZXY orientations.

The disclosure herein demonstrates the development of polymeric blends for material extrusion 3D printing platforms through characterization of mechanical properties, phase morphology, and 3D printer compatibility of novel copolymer blend systems (ABS:SEBS and ABS:UHMWPE:SEBS), each having different physical and chemical characteristics. Toward this goal, the 3D printability of novel binary and ternary polymer blends of varying constituent concentrations was determined by printing standard tensile test specimens and a roughness testing piece with multi-angled inclined planes using a commercially available MakerBot Replicator. In terms of roughness, the 50:50 ABS:SEBS provided smoother flat surfaces and the 75:25:10 ABS:UHMWPE:SEBS blend provided the smoothest sloped surfaces due to the rheological differences as compared with ABS and the other blends in this study. Mechanical testing was also performed on all printable copolymer blends. Through this testing, the inventors observed that blending any amount of SEBS and UHMWPE into an ABS matrix lowered the UTS of printed tensile specimens.

It was also observed when SEBS copolymer blends were loaded greater than 20%, the elongation percentage values (amount of plastic deformation endured by the material prior to failure) increased where tensile test samples printed from the 50:50 ABS:SEBS blend displayed elongation percentage values approaching 50% which is indicative of an increase in toughness of the material.

Characterization of the ABS:UHMWPE:SEBS and ABS:SEBS blends via SEM microanalysis revealed an insolubility of UHMWPE within the ABS matrix as for the ternary blends as well as a solubility threshold between ABS and SEBS for the binary blends. In all cases, ABS blends with altered physical properties were created and demonstrated to be compatible with a desktop grade material extrusion 3D printer. In the case of the binary ABS:SEBS blend, manipulation of the percentage of elongation at break was achieved by changing the ABS:SEBS ratio.

Figures 12A, 12B, 12C, 12D:
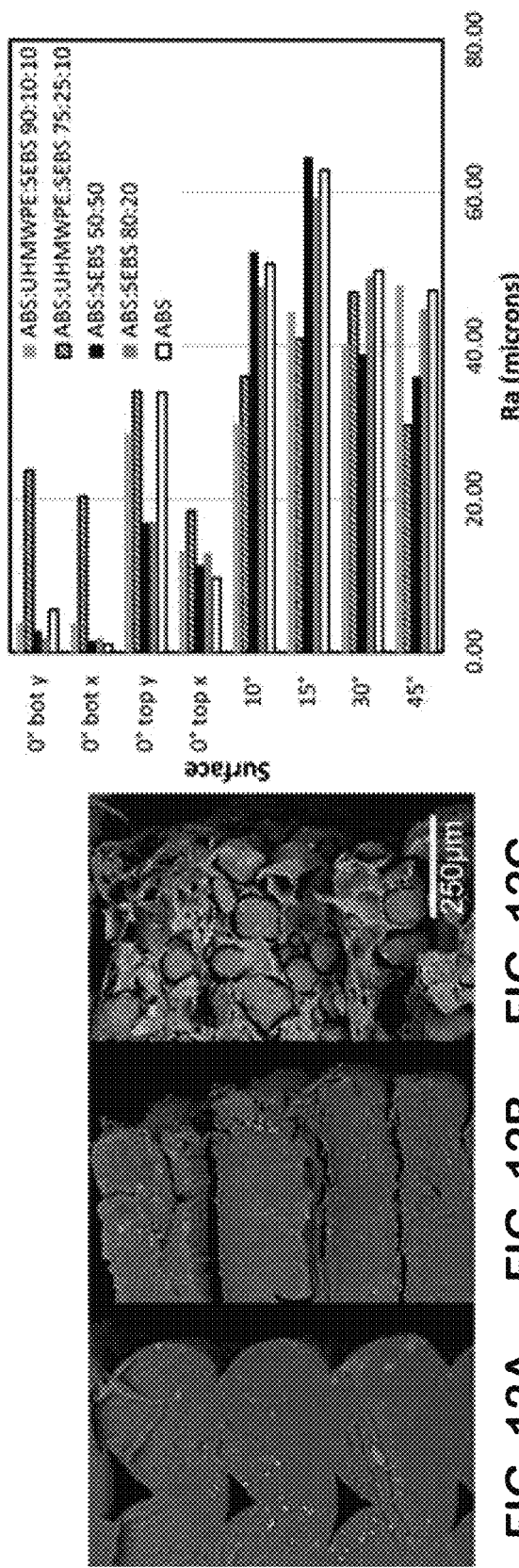
FIG. 12B illustrates the corresponding surface roughness data of FIG. 12A.

The SEM images of cross sections in FIG. 12A (left) ABS, FIG. 12A (center) ABS:SEBS 50:50 blend and FIG. 12A (right) ABS:UHMWPE:SEBS 75:25:10 indicate the differences in print rasters. FIG. 12B which provides corresponding surface roughness data from a test piece, confirms the ability of these novel blends to print smoother inclined planes.

While the addition of UHMWPE was detrimental to the ultimate tensile strength (UTS), the result was a 3D printable material capable of printing smoother inclined planes than the ABS base material alone. The examples herein demonstrate the ability to create 3D printer compatible materials with tailorable physical properties that can be customized for a given application.

A modification of the materials previously described herein involves synthesizing polymeric matrix composites (PMCs) wherein the matrix material is already known to be compatible with material extrusion 3D printers. Currently, material extrusion 3D printing (ME3DP) platforms are capable of printing only a handful of polymeric materials such as acrylonitrile butadiene styrene (ABS), polycarbonate (PC), and polylactic acid (PLA) thus imposing limitations on the applicability of objects fabricated from them. The addition of reinforcing agents to printable polymeric materials leads to an enhancement of physical properties and overall usefulness of the material extrusion 3D printing process.

Furthermore, the present disclosure teaches methods and related compositions that produce polymer blends and alloys wherein the main component is a 3D-printable material. As with the synthesis of PMCs the intent is to augment the physical properties of polymeric materials which are known to be compatible with 3D-printers. The key difference is that novel polymeric blends are taught. A benefit of this objective is the creation of new polymers which can then be used as a matrix material in new PMC systems.

Yet another aspect of the present disclosure involves evaluating the ability to use novel polymeric matrix composites in material extrusion 3D printers. Barriers to the success of the implementation of polymer matrix composites in a form usable by material extrusion 3D printers must be overcome or mitigated. These barriers include, but are not limited to: 1) a melt flow viscosity too great for the printer to extrude; 2) clogging of the extrusion mechanism of the printer due to the additives; and 3) lack of adhesion between the printed layers.

The present disclosure also describes the characterization of the effect of reinforcement materials on the physical properties of composite systems. Several methods such as mechanical testing to determine the strength, rheological evaluations and scanning electron microscopy (SEM) are used to evaluate and define the physical changes associated with the addition of reinforcement agents.

In addition, the present disclosure teaches the outcome of efforts to assess the effect of reinforcement materials on weaknesses associated with build orientation. A characteristic of parts fabricated from ME3DP is a relationship between strength and build orientation. Most notable is the decrease in strength for tensile specimens fabricated in the vertical or "Z" direction as compared to parts fabricated horizontally in the "X" or "Y" direction. Data analysis of mechanical testing is used to evaluate the effect of additives on build orientation strength.

As disclosed herein, great progress has been made in the creation of both polymer matrix composites and polymer blends that are compatible with ME3DP platforms. Emphasis on understanding the mechanisms dictating mechanical property anisotropy related to build orientation and/or raster pattern sensitivity has also been made. Two common 3D printable materials, acrylonitrile butadiene styrene (ABS) and polylactic acid (PLA), have served as the base resins for the composites and blends described herein. Results disclosed herein demonstrate: 1) an ability to manipulate the mechanical property anisotropy; 2) an ability to control the dispersion of additives within a polymer matrix; 3) an ability to tailor the elasticity of 3D printable materials; and 4) an ability to manipulate the rheological properties of 3D printable materials. At the same time, since all of the test specimens have been 3D printed, these materials are compatible with 3D printer systems. More importantly, a procedure to analyze the key aspects governing mechanical property anisotropy, the effectiveness of polymer blending, rheological behaviors, and other critical aspects has been established.

In general, another aspect of the present disclosure is the solving of challenges associated with augmenting the physical properties of 3D printable materials. This includes strategies to manipulate the physical properties of polymeric materials used in material extrusion 3D printing to generate polymer matrix composites (PMC)s and polymer blends (PB)s wherein the main constituent in each case is a known printable material such as acrylonitrile butadiene styrene (ABS), polylactic acid (PLA), and polycarbonate (PC). Meeting these objectives involves tackling two main challenges: 1) decreasing the presence of air voids within a printed part; and 2) lowering the mechanical property anisotropy caused by print direction and raster pattern.

FIGS. 13A-13B illustrate the two main causes of void formation in 3D printed structures: voiding due to print raster (see FIG. 13A) and voids which manifest within the polymer matrix (see FIG. 13B).

Decreasing the presence of voids within the printed structure entailed the lessening of air gaps between print rasters (as depicted in FIG. 13A), as well as a decrease of the presence of voids within the compounded material which is more pertinent in the creation of PMCs (FIG. 13B). The presence of voids within the material has been found to be caused by two main sources: 1) the presence of moisture; and 2) outgassing of aromatics from the polymer material itself where the emitted gasses nucleate on the additive particle and lead to the nucleation of a gas bubble within the material as depicted in FIG. 13B.

A solution to the problem of void formation has been the tweaking of the base resin (for example, ABS) with olefin-containing thermoplastic elastomers. In one aspect of the present disclosure, styrene ethylene butylene styrene (SEBS) was utilized as this elastomer. This strategy aligns with objectives for the creation of polymer matrix composites wherein the matrix material was a new polymer blend as disclosed herein. From a microstructural point of view, the integration of PMC and PB compounding led to great progress in the decrease in voids within the printed structure as revealed by scanning electron microscopy (SEM) microanalysis of the fracture surfaces of printed tensile test specimens. As compared to ABS alone, there was a drastic difference in the number of voids present due to print rasters.

Figure 14:
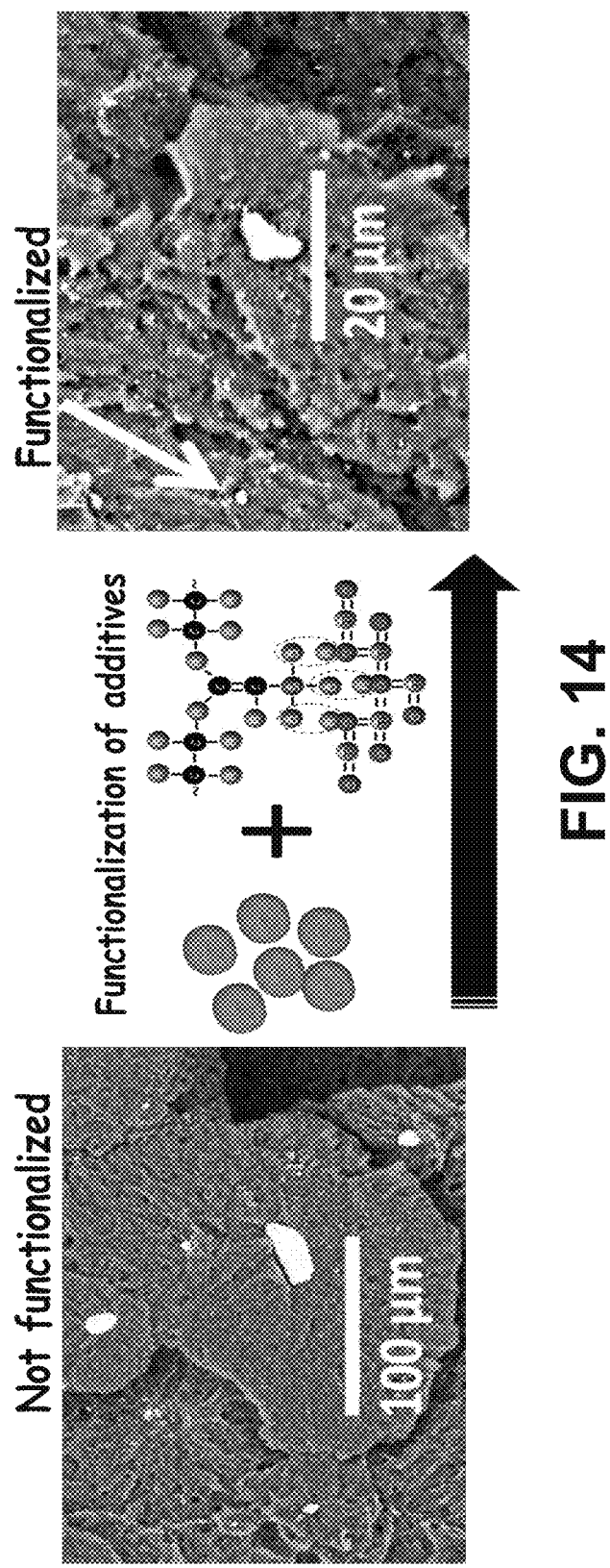
FIG. 14 illustrates that functionalizing additives prior to compounding lessened the size of particle aggregates, as depicted in the variations in the SEM image, from before functionalization in FIG. 14 (left) to after functionalization in FIG. 14 (right).
Figure 15C:
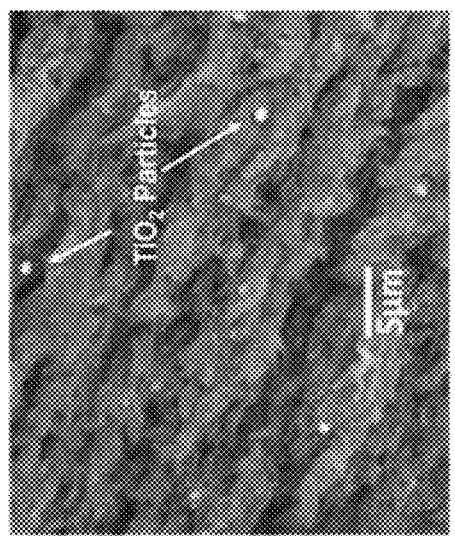
FIG. 15 illustrates the SEM results obtained before FIG. 15 (left) and after FIG. 15 (center) blending ABS with SEBS for a TiO2 composite, while FIG. 15 (right) emphasizes in a higher magnification SEM of the ABS/SEBS blend, a decrease in particle aggregation.
Figure 15B:
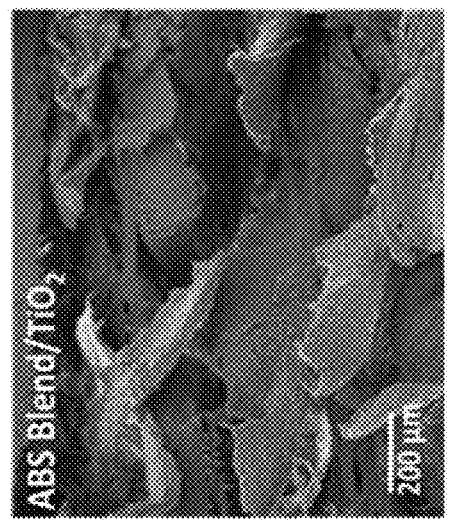
Figure 15A:
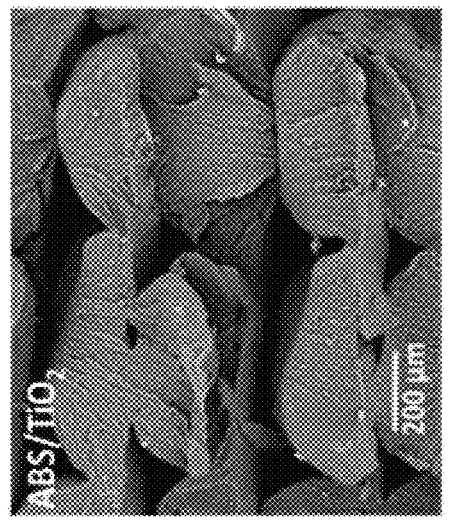

A functionalization process involving silane is also taught using $TiO_2$ in ABS, as illustrated in FIG. 14. Specifically, as depicted in the SEM images of FIG. 14, functionalizing additives prior to compounding lessened the size of particle aggregates. This is then integrated into the creation of a $TiO_2$ composite wherein the resin was an ABS/SEBS blend as illustrated in FIG. 15 (where the effect of blending ABS with SEBS on the decrease in print raster voids can also be seen). FIG. 15 illustrates various SEM images which teach that blending ABS with SEBS decreased the presence of print rasters within the printed part and also aided in the decrease in particle aggregation for a $TiO_2$ composite.

The creation of stand-alone polymer blends has dealt mainly with the blending of ABS and SEBS of various grades and molecular weight. Earlier efforts dealt specifically with ABS grade MG37CR (SABIC, Pittsfield, Mass. USA) and Kraton SEBS (Grades A1536 HU SEBS and FG1901 GT SEBS grafted MA) supplied by Kraton (Houston, Tex., USA). As disclosed herein, it was determined that lower molecular weight (inferred from melt flow index data) grades of resin blend more completely and thus data using ABS Grade MG47 and Grade MG94 has been generated. The differences in melt flow index for these three ABS grades can be seen in Table V below.

TABLE V

Melt flow index values for the ABS used in preliminary work compared to the ABS used in the present disclosure.

| Grade | Melt Flow Index, g/10 min | Temp. ° C. |
| --- | --- | --- |
| MG37CR | 4.4 | 230 |
| MG47 | 7.42 | 230 |
| MG94 | 14.83 | 230 |

Work involving ABS Grade MG37CR blended with SEBS grade A1536 HU was also conducted, and is included as a comparison throughout this disclosure and can be found in C. R. Rocha, A. R. Torrado Perez, D. A. Roberson, C. M. Shemelya, E. MacDonald, and R. B. Wicker, "Novel ABS-based binary and ternary polymer blends for material extrusion 3D printing," *Journal of Materials Research*, vol. 29, no. 17, pp. 1859-1866, 2014, incorporated by reference herein, in its entirety.

Figures 16A, 16B:
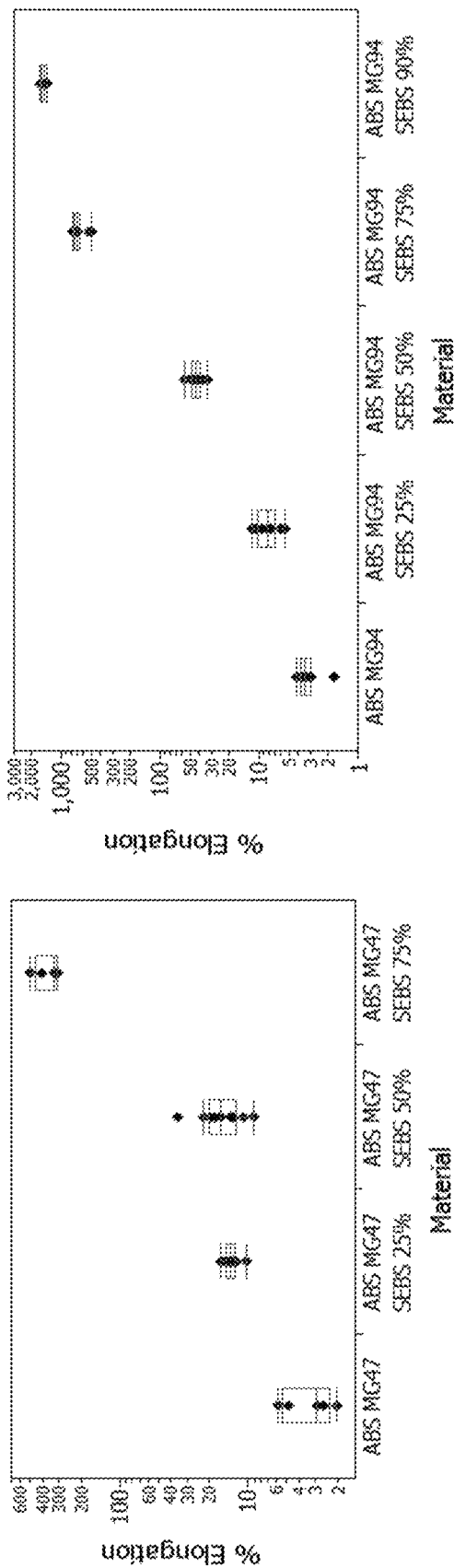

The present disclosure demonstrates the ability to customize the physical properties of the resulting polymer blend by increasing the weight percentage of SEBS in the blend. FIGS. 16A-16B illustrate the percent elongation at break for 3D printed specimens fabricated from ABS MG47 blended with FX1901 GT SEBS (FIG. 16A) and ABS MG94 blended with FX1901 GT SEBS (FIG. 16B).

As can be seen in the tensile test data presented in FIGS. 16A-16B, when using ABS MG94 as the ABS grade we able to tune the % elongation of tensile test specimens from 3.32±0.75% for filament extruded from ABS MG94 to 1506.57±109.6% for a blend of 10% ABS MG94 and 90% SEBS FG1901 GT.

By contrast, when blending the higher molecular weight ABS MG37CR with the higher molecular weight SEBS A1536 HU, a printable blend with SEBS levels greater than 50% by weight, could not be created. Also, the maximum blend created using ABS MG47 was 75% by weight SEBS when using the lower molecular weight FG1901 GT.

FIG. 17 depicts the melt flow index (MFI) results for the binary blends of ABS and SEBS disclosed as a teaching herein. Melt flow index (MFI) values for the blends created during this project tell us aspects of the blending process that warrant further investigation. In the case of ABS MG47, the MFI values for the ABS are roughly half that of those for the grade of SEBS (7.42 compared to 15.72 g/10 min). For the blend of 75% ABS, the MFI increases slightly indicating the flow of the material is dictated by the ABS content. When the weight ratio of SEBS is increased to 50% there is a drastic increase in the MFI value to 23.25 g/10 min which is greater than the MFI values for either constituent. When the weight ratio is increased to 75% the MFI value decreased to 18.55 g/10 min which is still higher than either constituent, but indicative of a change in the mixing behavior of the two polymers. These consolidated MFI values are depicted in the annotated table illustrated in FIG. 17.

When ABS MG94 was used, the drastic increase in MFI was observed at a lower weight ratio of SEBS indicating the lower molecular weight of the ABS led to a change in the mixing behavior. The MFI values begin to decrease significantly at a ratio of 90% SEBS indicating the flow of the material is dictated by the SEBS content for this weight ratio. The working theory is that polymer alloying is occurring for the materials which have a higher MFI value. The use of attenuated total reflectance Fourier transform infrared spectroscopy (ATR-FTIR) and transmission electron microscopy (TEM) is taught as a means of evaluating polymer alloying. Other teachings include characterization of composites based on polycarbonate and high temperature polymers such as PEEK.

Yet another aspect of the present disclosure relates to decreasing the mechanical property anisotropy of 3D printed parts. This was carried out through the rigorous evaluation of various composites and blends based on ABS. Essentially, this challenge requires overcoming an aspect of the 3D printing process itself.

This, for example, in a tensile test specimen which was injection molded (FIG. 18A), involves breaking of the strong covalent bonds holding the polymeric chains together. For a 3D printed part, the failure of a part entails the breaking of both covalent bonds and weaker bonds such as van der walls bonds (FIG. 18B). Mechanical property anisotropy is observed to be most prominent when comparing specimens printed in the horizontal XYZ and vertical ZXY direction or samples which have a raster pattern similar to what is observed in the ZXY direction where failure is dominated by the failure between raster layers (FIG. 18C).

As noted in FIG. 18C, the SEM of the fracture surface indicates that failure occurred predominantly within the inner-raster interface.

As noted in FIGS. 18A-18C, failure of an injection molded specimen may entail drawing of the polymeric chains and eventually breaking of the covalent bonds (FIG. 18A), while failure of a 3D printed part may entail failure of both covalent and weaker bonds such as van der walls (FIG. 18B) while samples printed in certain orientations will have a failure mode dictated by the failure of weak bonds (FIG. 18C).

An early survey of composites and blends revealed a ternary blend of ABS, ultra high molecular weight polyethylene (UHMWPE), and SEBS exhibited lower mechanical property anisotropy as compared to the other materials studied and compared to ABS alone. The earlier ternary blend work (FIG. 7) involved the higher molecular weight ABS grade MG37CR, the higher molecular weight SEBS grade A1536 HU and GUR® 1020 UHMWPE, (Celeanese, Irving, Tex., USA). Specifically, the preferred weight ratio blend of 75:25:10 ABS:UHMWPE:SEBS is disclosed.

Figure 19:
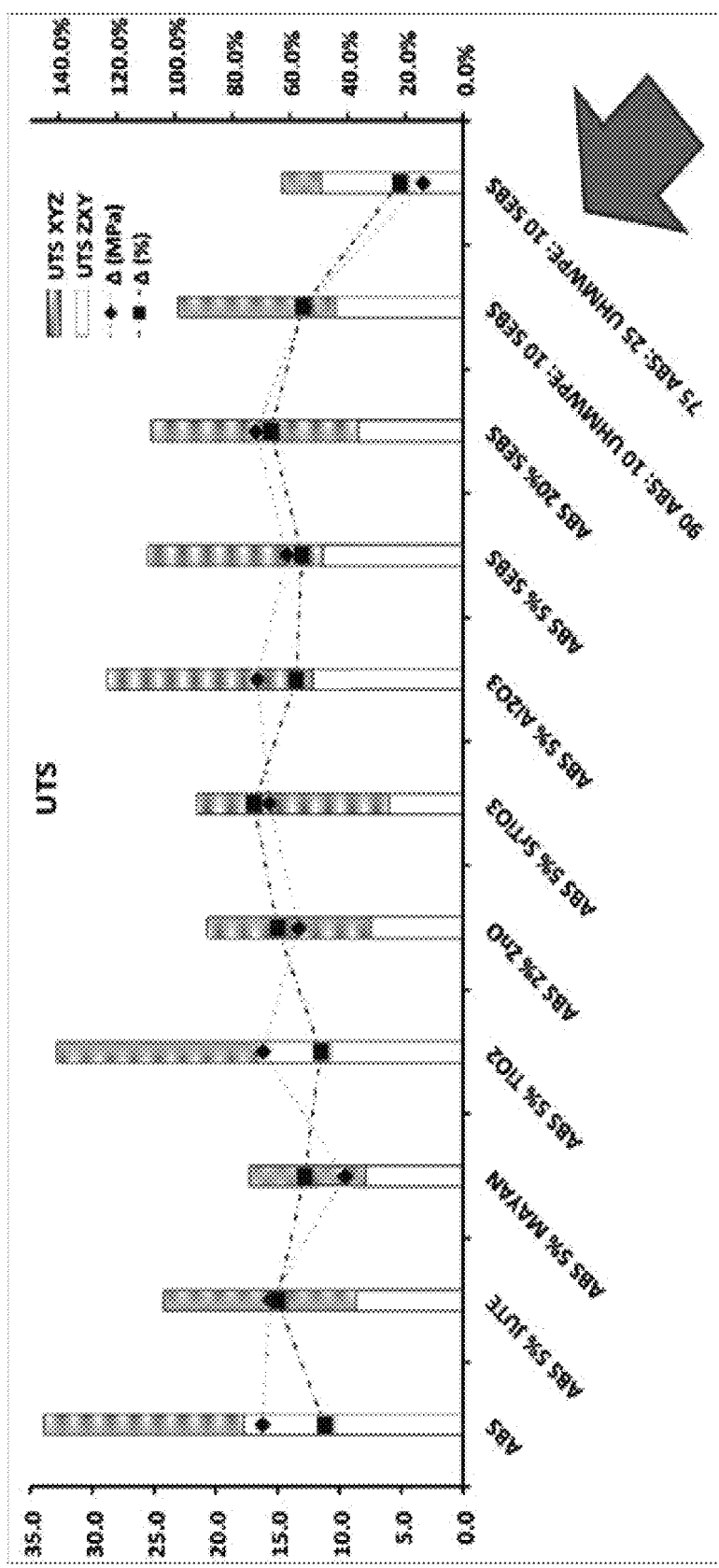
FIG. 19 is a graph of the anisotrophy values, specifically UTS, of the of various materials taught by the present disclosure.

FIG. 19 illustrates the results of a survey of various composites produced as a result of the teachings of the present disclosure. The results revealed a ternary blend of 75 ABS:25 UHMWPE:10 SEBS showed greater promise in the reduction of mechanical property anisotropy.

Understanding why the ternary blend exhibited lower mechanical property anisotropy characteristics was examined. Analysis of cross sections via scanning electron microscopy (SEM) revealed the compounding process did not dissolve the UHMWPE particles, but created essentially a polymer/polymer composite. As seen in FIG. 20, the effect this had on a 3D printed part was an obscuring of the print rasters. In the context of a tensile test specimen printed in the ZXY orientation, what would normally be a smooth fracture plane was converted to a surface with complex geometry (FIG. 20). The affect this had was that the obscuring of the raster interface was the same no matter the print direction meaning the resulting tensile specimens exhibited lower mechanical property anisotropy than ABS baseline samples. Thus, as exhibited in FIG. 20, the presence of UHMWPE particles obscures the print raster resulting in lower mechanical property anisotropy for 3D printed parts.

Ternary blending was further explored by repeating experiments with lower molecular weight ABS (grade MG47) and then again with a lower molecular weight SEBS (FG1901 GT). FIG. 21A illustrates the anisotropy values for the ternary blends created under the teachings of the present disclosure while FIG. 21B illustrates the same evaluation after the application of a geometric correction factor.

The results depicted in FIG. 21A illustrate that most blends produce lower anisotropy as compared to ABS, but the best performer remained the original ternary polymer blend (arrow). Further examination of the tensile test specimens revealed that a geometric correction factor may be needed as the specimens printed were essentially circular in nature due to a nuance of the 3D printer. Upon application of the correction factor (FIG. 21B), it was found that the mechanical property anisotropy dropped to nearly 0% when evaluating by either relative % or raw number.

An obvious detractor of the ternary blend material systems is decrease in mechanical strength as compared to ABS. However the strategy of obscuring the print raster interface was proven to be a viable method for decreasing the mechanical property anisotropy.

Continued efforts in the area of decreasing mechanical property have been carried out involving composites where the base resin in polylactic acid, which is becoming the most commonly used material among desktop grade material extrusion 3D printers. In cases where the secondary goal was the creation of sustainable composites, PLA was blended with NaCl.

Figure 22:
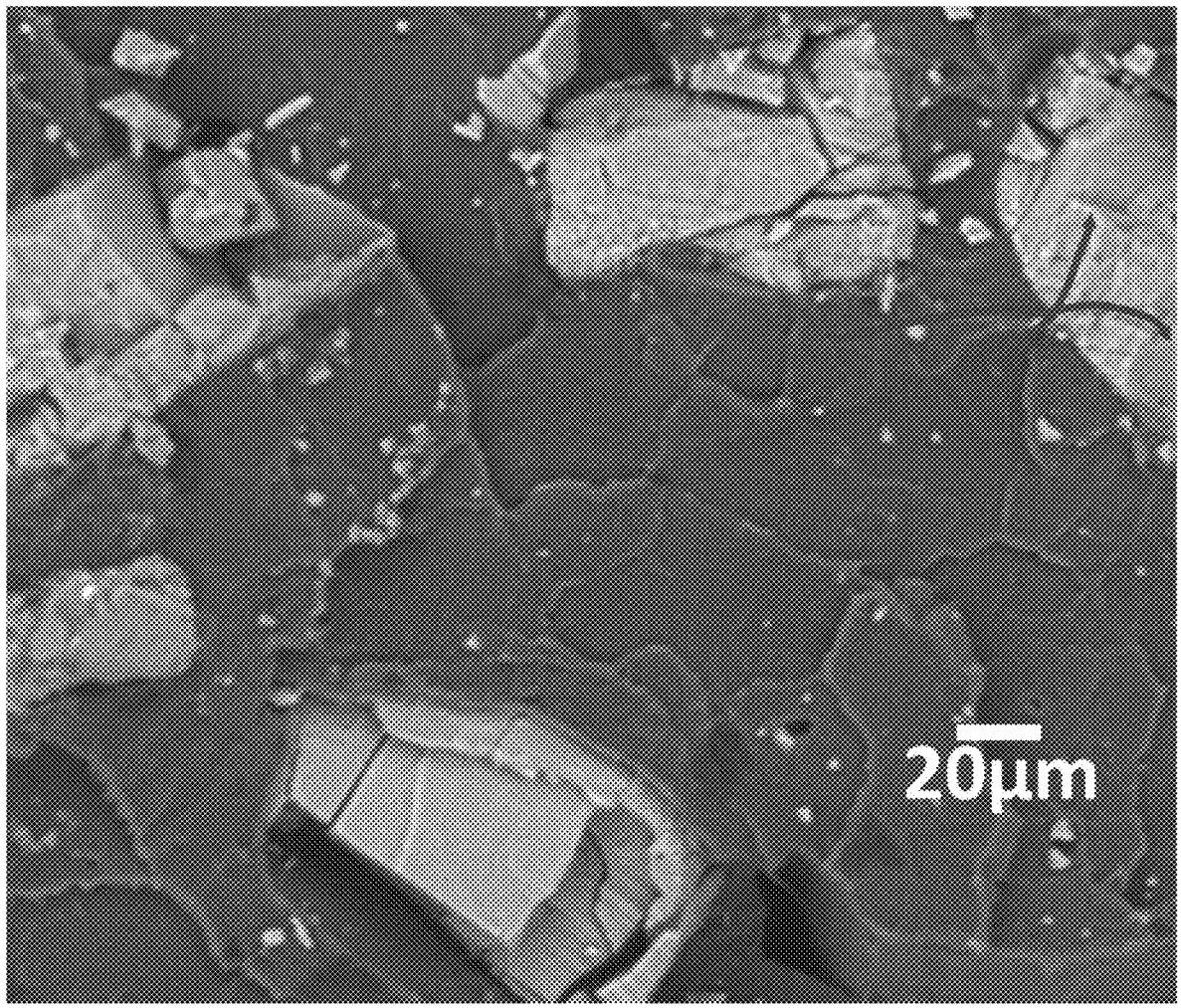
FIG. 22 illustrates an SEM of the fracture surface of a PLA/NaCl composite.

FIG. 22 is an SEM image of the fracture surface of a PLA/NaCl composite. Note the shared fracture features. Initial SEM microanalysis of the of tensile test specimen fracture surfaces revealed the NaCl to produce a robust bond with the PLA matrix (FIG. 22) to the point where crack propagation fronts were common between the matrix and the NaCl particle. This observation is significant given that in other work carried out as a part of this present disclosure, it has been determined that a functionalization process may be needed to improve the adhesion between polymers and non-polymeric materials such as metal oxides and plant fibers.

Figure 23:
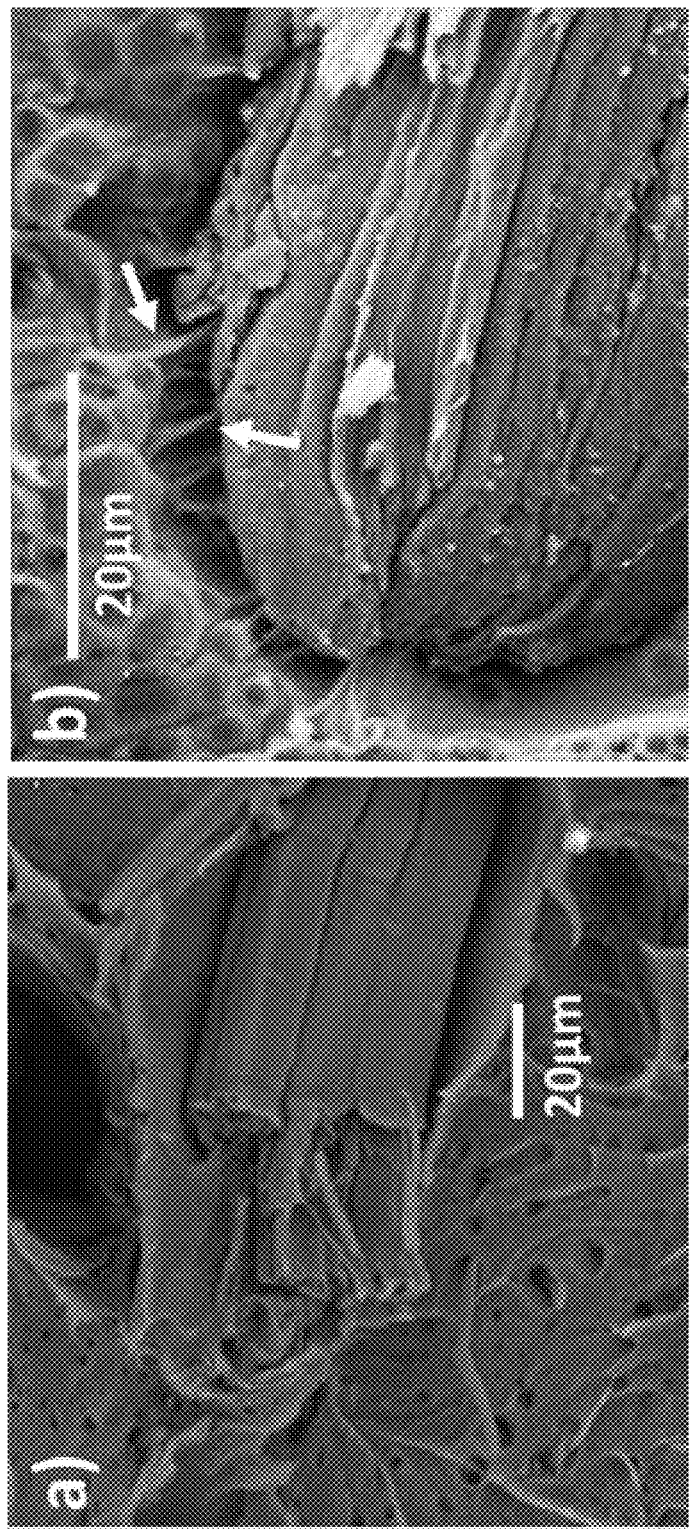
FIG. 23A depicts an SEM image of a jute plant fiber/PLA composite and FIG. 23B depicts an SEM image of a jute plant fiber which was first functionalized with an aqueous NaCl solution, and, FIG. 24 illustrates graphically that the addition of NaCl to PLA decreases the mechanical property anisotrophy of printed tensile test specimens.

NaCl proved to produce such a robust bond with PLA, that the present disclosure teaches the use of a saturated aqueous solution of NaCl as a functionalization agent for jute plant fibers. It was found that the interface between the plant fibers and PLA matrix possess polymer fibrils which are indicative of a strong bond between the fiber and matrix (see FIG. 23). FIG. 23A depicts an SEM image of a jute plant fiber/PLA composite and FIG. 23B depicts an SEM image of a jute plant fiber which was first functionalized with an aqueous NaCl solution. Note the presence of fibrils indicated by white arrows.

Figure 24:
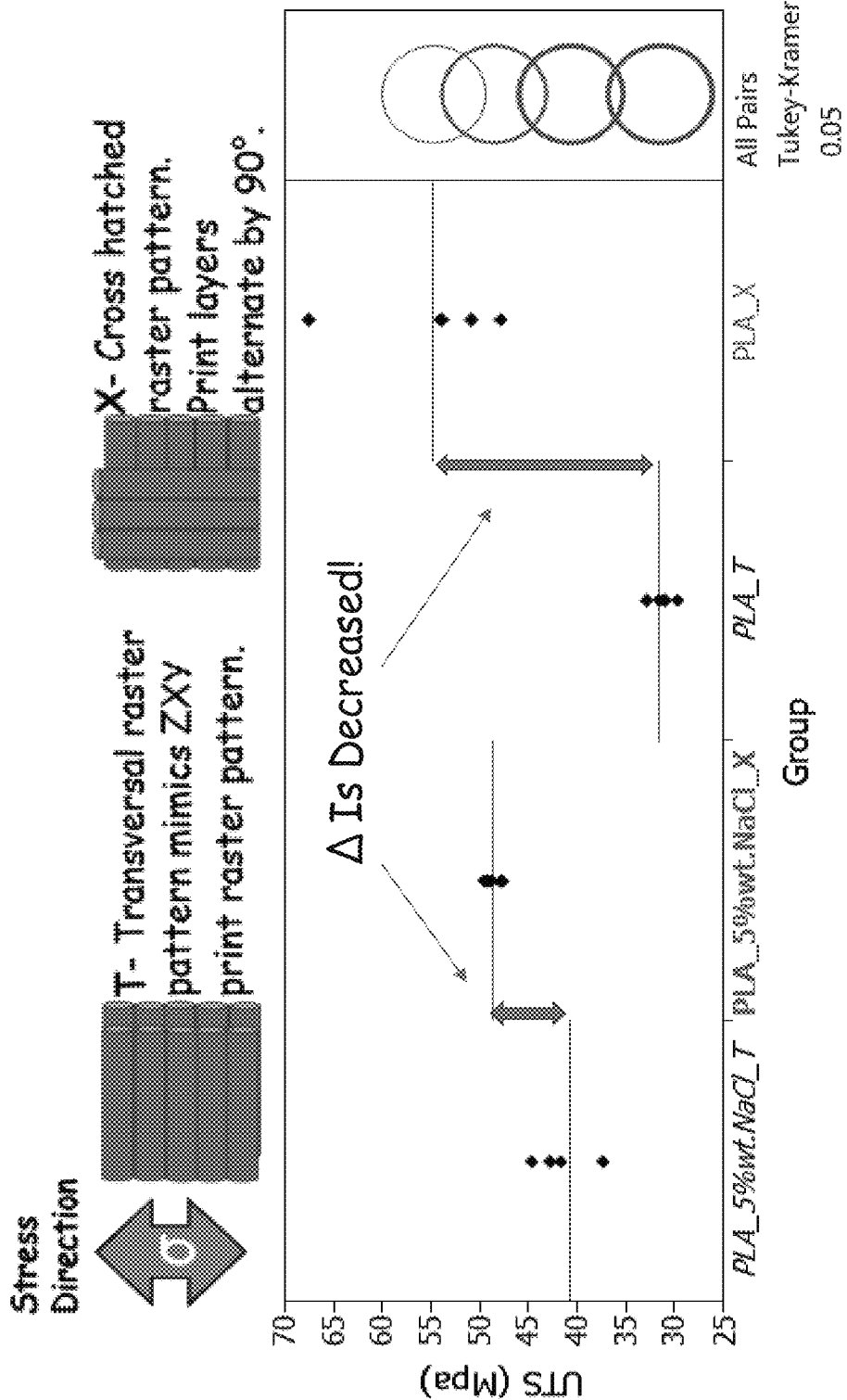

In terms of anisotropic evaluation, a PLA composite loaded with 5% by weight NaCl was found to decrease mechanical property sensitivity to raster pattern. Here, two raster patterns were tested: 1) a cross hatched pattern where print raster pattern alternated by 90° with each subsequent layer; and 2) a transversal pattern where the raster path was perpendicular to the direction of strain, which essentially was a "faux vertical" print. As illustrated in FIG. 24, the mechanical anisotropy was decreased without a decrease in mechanical strength as compared to PLA baseline samples. Specifically, as depicted in FIG. 24, the addition of NaCl to PLA decreased the mechanical property anisotropy of printed tensile test specimens without compromising the overall strength of the material.

The present disclosure also teaches the use of organo nanoclays in 3D printable materials synthesis. Use of pigments such as those produced by Mayan Pigments Inc. (El Paso, Tex.) has illustrated that the addition of pigments based on palygorskite (an organo nanoclay) leads to a decrease in material viscosity at elevated temperatures (results not shown). Two versions of MayaCrom® pigments, Blue and Yellow, have shown both a decrease in complex viscosity in as verified by dynamic mechanical analysis (DMA).

Other teachings relate to PLA composites and indicate that NaCl has the potential to allow PLA to be used at higher temperatures. Furthermore, the present disclosure teaches the use of organo nanoclay pigments to increase the stability of PLA upon exposure to moisture.

The present disclosure teaches the development and use of a novel class of 3D printable materials with a diverse set of physical properties which enables the production of innumerable 3D printed multifunctional components. The ability to manufacture high functioning components rapidly, anywhere, at any time emphasizes the superior properties of the methods and compositions taught by the present disclosure.

In another aspect of the disclosure, the polymer blends may be used in common 3D printer technologies using fused deposition modeling (FDM) or, more generally, fused filament fabrication (FFF). FDM printers work by using a plastic filament (e.g., acrylonitrile butadiene styrene (ABS) or polylactic acid (PLA) provided as strands of filament) that is unwound from a spool mounted onto the printer housing. The plastic filament is used to supply material to a print head with an extrusion nozzle, e.g., a gear pulls the filament off the spool and into the extrusion nozzle. The extrusion nozzle is adapted to turn its flow on and off. The extrusion nozzle (or an upstream portion of the print head) is heated to melt the plastic filament as it is passed into the extrusion nozzle so that it liquefies. The extrusion nozzle deposits the liquefied material in ultra fine lines, e.g., in lines that are about 0.1 millimeters across.

The extrusion head and its outlet are moved, in both horizontal and vertical directions to complete or print each layer of the 3D model, by a numerically controlled mechanism that is operated by control software running on the 3D printer, e.g., a computer-aided manufacturing (CAM) software package adapted for use with the 3D printer. The build plate is typically stationary with its upper planar surface parallel to a horizontal plane (or horizontal to the nozzle or its printed layers). If the build plate is moved at all, it is only moved up and down vertically (i.e., in the z-direction). The extruded melted or liquefied material quickly solidifies to form a layer (and to seal together layers of the 3D object), and the extrusion nozzle is then moved vertically prior to starting the printing of the next layer. This process is repeated until all layers of the 3D object have been printed.

A significant limitation with existing 3D printing techniques overcome by the teachings of the present disclosure is that the physical and other material properties of each printed 3D object are defined by the material used to print the 3D object. This can be very limiting as many additive 3D printing technologies can usually only use a single material. It may be desirable to print a 3D object that is elastic or "soft" in all or at least some of its elements. For example, it may be useful to provide a 3D printer user with control over the elastic properties of a 3D object to print out an object with spatially varying properties to produce components for soft robots, to print skins for robots and animatronic devices, and to prototype or produce a wide variety of elastic consumer products. However, most 3D printers such as FFM printers will typically produce a very rigid and hard object, e.g., a rigid outer shell with a honeycomb in-fill that is also structurally stiff.

Hence, it would be desirable to provide a 3D printing method, and associated 3D printer or printer system, that can print a 3D object with material parameters, such as physical or mechanical characteristics or traits, that can be user or operator-defined. Preferably, such a 3D printing method and 3D printer system could be implemented using existing 3D printers and/or 3D printer technologies including additive techniques like FFM including those that utilize only a single print material. Materials disclosed herein greatly expand the universe of materials that may be utilized for such 3D printing.

Additionally, the blends disclosed herein may further contain rheological modifiers, plasticizers, precipitated or pyrogenous silicas, stabilizers, pigments and/or impact modifiers which modify the properties of the materials or article produced by the 3D printing process.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A polymeric matrix composite, comprising
   a ternary blend of a first polymer, a second polymer and a third polymer,
   wherein the first polymer is acrylonitrile butadiene styrene (ABS), the second polymer is styrene ethylene butadiene styrene (SEBS) and the third polymer is ultrahigh molecular weight polyethylene (UHMWPE).

2. The polymeric matrix composite of claim 1, wherein the polymeric matrix composite comprises a ratio of ABS:UEMWPE:SEBS between 75:25:10 and 90:10:10 by mass.

3. The polymeric matrix composite of claim 2, wherein the polymeric matrix composite comprises a ratio of ABS:UEMWPE:SEBS of about 75:25:10 by mass.

* * * * *